United States Patent
Jung et al.

(10) Patent No.: US 9,363,701 B2
(45) Date of Patent: Jun. 7, 2016

(54) METHOD FOR REPORTING IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Anyang-si (KR);
Youngdae Lee, Anyang-si (KR);
Sungjun Park, Anyang-si (KR);
Seungjune Yi, Anyang-si (KR);
Jaewook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/390,002

(22) PCT Filed: Apr. 5, 2013

(86) PCT No.: PCT/KR2013/002877
§ 371 (c)(1),
(2) Date: Oct. 1, 2014

(87) PCT Pub. No.: WO2013/151386
PCT Pub. Date: Oct. 10, 2013

(65) Prior Publication Data
US 2015/0056925 A1 Feb. 26, 2015

Related U.S. Application Data

(60) Provisional application No. 61/621,002, filed on Apr. 6, 2012, provisional application No. 61/665,293, filed on Jun. 27, 2012.

(51) Int. Cl.
*H04W 24/02* (2009.01)
*H04W 24/08* (2009.01)
(Continued)

(52) U.S. Cl.
CPC .................................... *H04W 24/10* (2013.01)

(58) Field of Classification Search
CPC ........ H04W 24/02; H04W 24/08; H04B 3/46; H04B 17/00; H04M 3/22; H04M 7/0084
See application file for complete search history.

(56) References Cited

U.S. PATENT DOCUMENTS 8,929,832 B2 * 1/2015 Jung ..................... H04W 24/10
370/252
8,934,846 B2 * 1/2015 Jung ..................... H04W 24/08
455/423

(Continued)

FOREIGN PATENT DOCUMENTS

| EP | 1739992 | 2/2010 |
| KR | 10-2004-0036474 | 4/2004 |
| KR | 10-2010-0030409 | 3/2010 |

OTHER PUBLICATIONS

PCT International Application No. PCT/KR2013/002877, Written Opinion of the International Searching Authority dated Jul. 29, 2013, 1 page.

*Primary Examiner* — Andrew Wendell
(74) *Attorney, Agent, or Firm* — Lee Hong Degerman Kang & Waimey; Jonathan Kang; Jeffrey Lotspeich

(57) ABSTRACT

Provided is a method for reporting by a terminal in a wireless communication system. The method logs, within a logged measurement, a log entry comprising a measurement result, wherein the log entry is related to one or more public land mobile networks (PLMN) contained in a minimization driving test (MDT) PLMN list for a logged measurement configuration provided for logging, and the method comprises: acquiring a new PLMN list; determining the validity of the log entry on the basis of the new PLMN list; and reporting the logged measurement report message to a network on the basis of the result of the validity determination.

18 Claims, 20 Drawing Sheets

(51) Int. Cl.
*H04B 17/00* (2015.01)
*H04W 24/10* (2009.01)

(56) References Cited

U.S. PATENT DOCUMENTS

| | | | | |
|---|---|---|---|---|
| 8,958,755 B2* | 2/2015 | Jung | ................... | H04W 24/08 455/423 |
| 8,971,294 B2* | 3/2015 | Yan | ................... | H04W 24/08 370/329 |
| 2007/0232306 A1 | 10/2007 | Johannesson et al. | | |
| 2008/0102896 A1 | 5/2008 | Wang et al. | | |
| 2012/0028611 A1* | 2/2012 | Wu | ................... | H04W 24/10 455/411 |
| 2012/0155390 A1* | 6/2012 | Ou | ................... | H04W 24/10 370/328 |
| 2013/0183978 A1* | 7/2013 | Keskitalo | ............. | H04W 24/10 455/436 |
| 2013/0184026 A1* | 7/2013 | Fu | ................... | H04W 24/10 455/517 |
| 2014/0287694 A1* | 9/2014 | Kim | ................... | H04W 64/00 455/67.13 |

* cited by examiner

METHOD FOR REPORTING IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2013/002877, filed on Apr. 5, 2013, which claims the benefit of U.S. Provisional Application Ser. No. 61/621,002, filed on Apr. 6, 2012, and 61/665,293, filed on Jun. 27, 2012, the contents of which are all hereby incorporated by reference herein in their entirety.

BACKGROUND OF THE INVENTION

1. Field of the Invention

The present invention relates to wireless communications, and more particularly, to a method of reporting by a user equipment in a wireless communication system, and an apparatus supporting the method.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Minimization of driving tests (MDT) is performed by venders for coverage optimization by using a user equipment (UE) instead of using an automobile. The coverage varies depending on a location of a base station (BS), a deployment of neighboring buildings, and a user's usage environment. Therefore, it is required for the vender to periodically perform the driving test, and a lot of costs and resources are consumed. The MDT is used by the vender to optimize a network by using the UE.

The MDT can be classified into a logged MDT and an immediate MDT. According to the logged MDT, after performing the MDT measurement, the UE delivers a logged measurement to the network at a particular time. According to the immediate MDT, after performing the MDT measurement, the UE delivers the measurement to the network when a report condition is satisfied. The logged MDT performs the MDT measurement in a radio resource control (RRC)_idle mode, and the immediate MDT performs the MDT measurement in an RRC_connected mode.

The vender can synthesize MDT measurements received from several UEs to create a coverage map which indicates a distribution of quality of service and whether a service is available across an overall area in which the vender provides a service, and thus can utilize the coverage map for a network operation and optimization. For example, when a coverage problem of a specific area is reported from the UE, the vender can increase transmit power of the BS which provides a service of the area to expand coverage of a corresponding cell.

A wireless communication system may have an environment in which one vender manages a plurality of public land mobile networks (PLMNs), or a plurality of venders manage the plurality of PLMNs. Regarding the PLMN, the UE may receive a PLMN list related to an MDT execution, and the UE may perform measuring and logging on the basis of the PLMN list. Meanwhile, a new PLMN list may be provided while the UE performs the MDT. In this case, there may be a problem regarding a validity of a log entry which is measured in advance and logged by the UE.

SUMMARY OF THE INVENTION

The present invention provides a method of reporting performed by a user equipment in a wireless communication system, and an apparatus supporting the method.

According to an aspect of the present invention, a method of reporting performed by a user equipment in a wireless communication system is provided. The method includes: logging a log entry containing a measurement result within a logged measurement, wherein the log entry is related to at least one public land mobile network (PLMN) contained in a minimization driving test (MDT) PLMN list for a logged measurements configuration provided for the logging; acquiring a new PLMN list; determining a validity of the log entry on the basis of the new PLMN list; and reporting a logged measurement report message to a network on the basis of a result of the validity determination.

In the aforementioned aspect of the present invention, the new PLMN list may be a new equivalent PLMN (EPLMN), and the new EPLMN list may contain at least one EPLMN for the user equipment.

In addition, the determining of the validity of the log entry may include: determining whether a specific PLMN related to the log entry is contained in the EPLMN list; and if the specific PLMN is not contained in the EPLMN list, determining that the log entry is invalid.

In addition, the new PLMN list may be a new MDT PLMN list, and the new MDT list may contain at least one PLMN for the logging of the user equipment.

In addition, the determining of the validity of the log entry may include determining whether the specific PLMN related to the log entry is contained in the MDT PLMN list; and if the specific PLMN is not contained in the EPLN list, determining that the log entry is invalid.

In addition, the method may further include: if the new PLMN list is acquired, discarding the logged measurement in which the log entry is logged; and logging a new log entry including a logging result in a new logged measurement on the basis of the new PLMN list. The logged measurement report message may contain the new logged measurement.

In addition, the method may further include, if it is determined that the log entry is invalid, discarding the log entry. The logged measurement report message may contain a logged measurement in which the log entry is excluded.

In addition, the log entry may be discarded after the logged measurement report message is reported.

In addition, the logged measurement report message may contain: a logged measurement in which the log entry is logged; the MDT PLMN list; and the new PLMN list.

According to another aspect of the present invention, a wireless device operating in a wireless communication system is provided. The wireless device includes: a radio frequency (RF) unit for transmitting and receiving a radio signal; and a processor operatively coupled to the RF unit. The processor may be configured for: logging a log entry containing a measurement result within a logged measurement, wherein the log entry is related to at least one PLMN contained in a MDT PLMN list for a logged measurements configuration provided for the logging; acquiring a new PLMN list; determining a validity of the log entry on the basis of the new PLMN list; and reporting a logged measurement report message to a network on the basis of a result of the validity determination.

According to a method of reporting based on a logged MDT execution proposed in the present invention, when there is a change in an equivalent public land mobile network (EPLMN) list and/or a minimization of driving tests (MDT) public land mobile network (PLMN) list, a user equipment (UE) may determine whether the PLMN list is valid and may report a logged measurement. In the reporting, the UE reports only a valid log entry or provides information which allows a network to determine a validity of a log entry together. Accordingly, the network can appropriately acquire a valid log entry. An invalid log entry can be distinguished through such an operation, and the network can more efficiently implement a network optimization on the basis of location information and a measurement result based on the valid log entry.

In a case where the MDT PLMN list is provided to the UE, if the MDT PLMN list is provided with a PLMN list format which is subjected to delta signaling proposed in the present invention, a signal overhead which occurs when a logged measurements configuration is provided to perform a logged MDT can be decreased.

DESCRIPTION OF EXEMPLARY EMBODIMENTS

Figure 1:
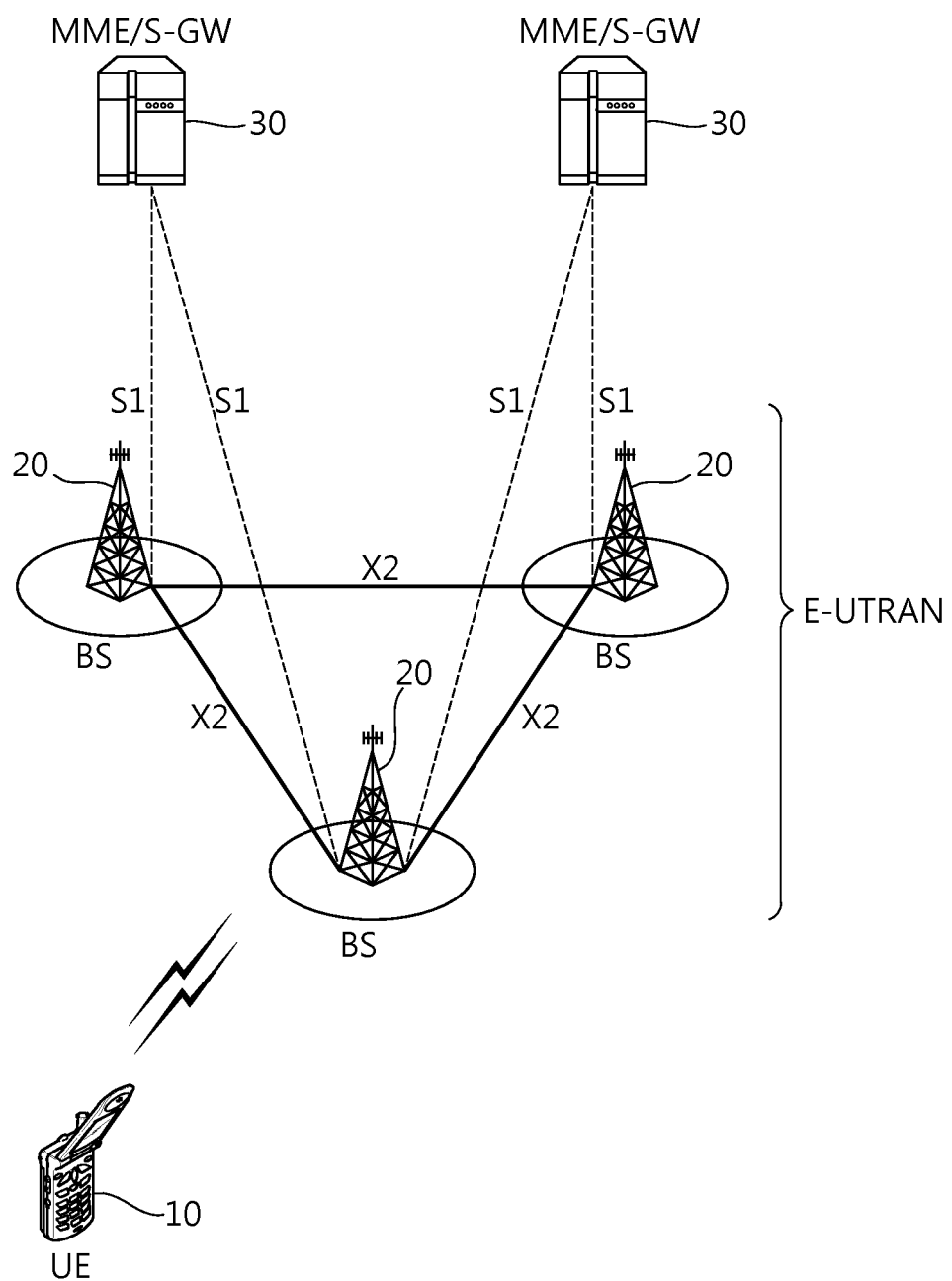
FIG. 1 shows a wireless communication system to which the present invention is applicable.

FIG. 1 shows a wireless communication system to which the present invention is applicable. The wireless communication system can also be called an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
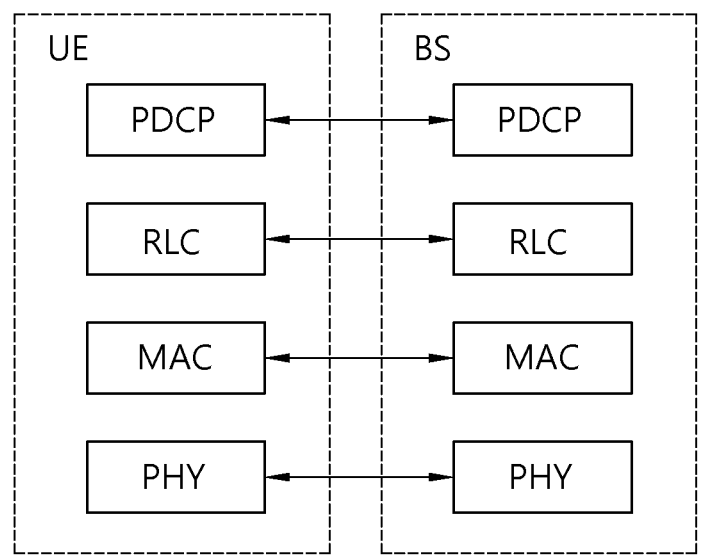
FIG. 2 is a diagram showing a radio protocol architecture for a user plane.
Figure 3:
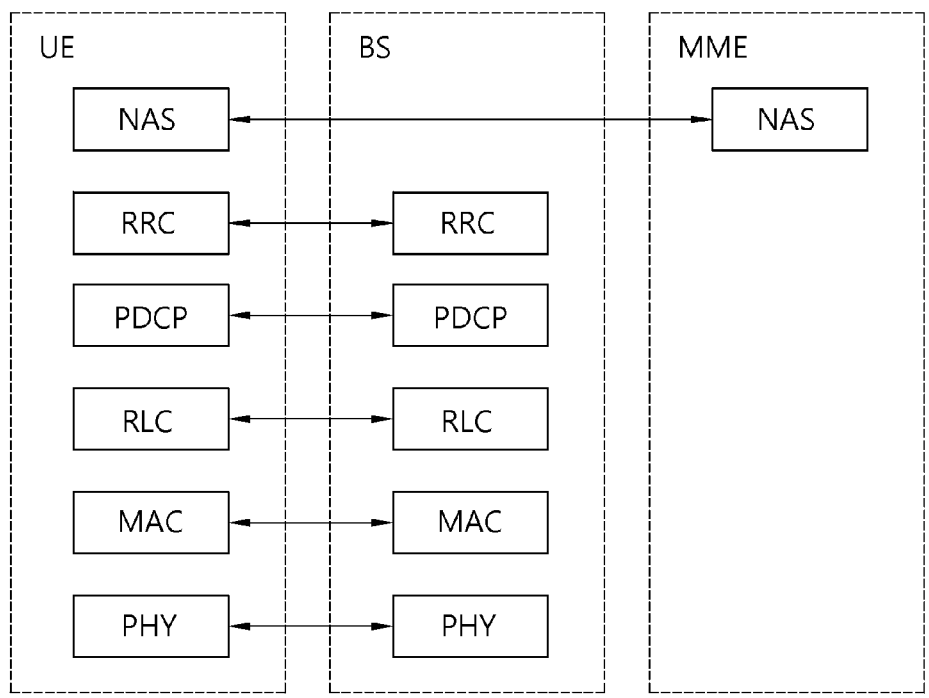
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

A function of a packet data convergence protocol (PDCP) layer in the user plane includes user data delivery, header compression, and ciphering. A function of a PDCP layer in the control plane includes control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_connected state, and otherwise the UE is in an RRC_idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism are described.

The RRC state indicates whether an RRC layer of the UE is logically connected to an RRC layer of an E-UTRAN. If the two layers are connected to each other, it is called an RRC_connected state, and if the two layers are not connected to each other, it is called an RRC_idle state. When in the RRC_connected state, the UE has an RRC connection and thus the E-UTRAN can recognize a presence of the UE in a cell unit. Accordingly, the UE can be effectively controlled. On the other hand, when in the RRC_idle state, the UE cannot be recognized by the E-UTRAN, and is managed by a core network (CN) in a tracking area unit which is a unit of a wider area than a cell. That is, regarding the UE in the RRC_idle state, only a presence or absence of the UE is recognized in a wide area unit. To receive a typical mobile communication service such as voice or data, a transition to the RRC_connected state is necessary.

When a user initially powers on the UE, the UE first searches for a suitable cell and thereafter stays in the RRC_idle state in the cell. Only when there is a need to establish an RRC connection, the UE staying in the RRC_idle state establishes the RRC connection with the E-UTRAN through an RRC connection procedure and then transitions to the RRC_connected state. Examples of a case where the UE in the RRC_idle state needs to establish the RRC connection are various, such as a case where uplink data transmission is necessary due to a user's call attempt or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successful, the UE and the MME enter the EMM-REGISTERED state.

To manage a signaling connection between the UE and the EPC, two states are defined, i.e., an EPS connection management (ECM)_idle state and an ECM_connected state. These two states apply to the UE and the MME. When a UE in the ECM_idle state establishes an RRC connection with the E-UTRAN, the UE enters the ECM_connected state. When an MME in the ECM_idle state establishes an S1 connection with the E-UTRAN, the MME enters the ECM_connected state. When the UE is in the ECM_idle state, the E-UTRAN does not have context information of the UE. Therefore, the UE in the ECM_idle state performs a UE-based mobility related procedure such as cell selection or reselection without having to receive a command of the network. On the other hand, when the UE is in the ECM_connected state, a mobility of the UE is managed by the command of the network. If a location of the UE in the ECM_idle state becomes different from a location known to the network, the UE announces the location of the UE to the network through a tracking area update procedure.

Next, system information is described.

The system information includes necessary information that must be known to a UE to access a BS. Thus, the UE has to receive all pieces of system information before accessing the BS. Further, the UE always has to have recent system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, the UE recognizes a cell type differently according to which service can be provided. A service type is first described below, and then the cell type is described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network vender, and a cell can be used only by the network vender and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a normal service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
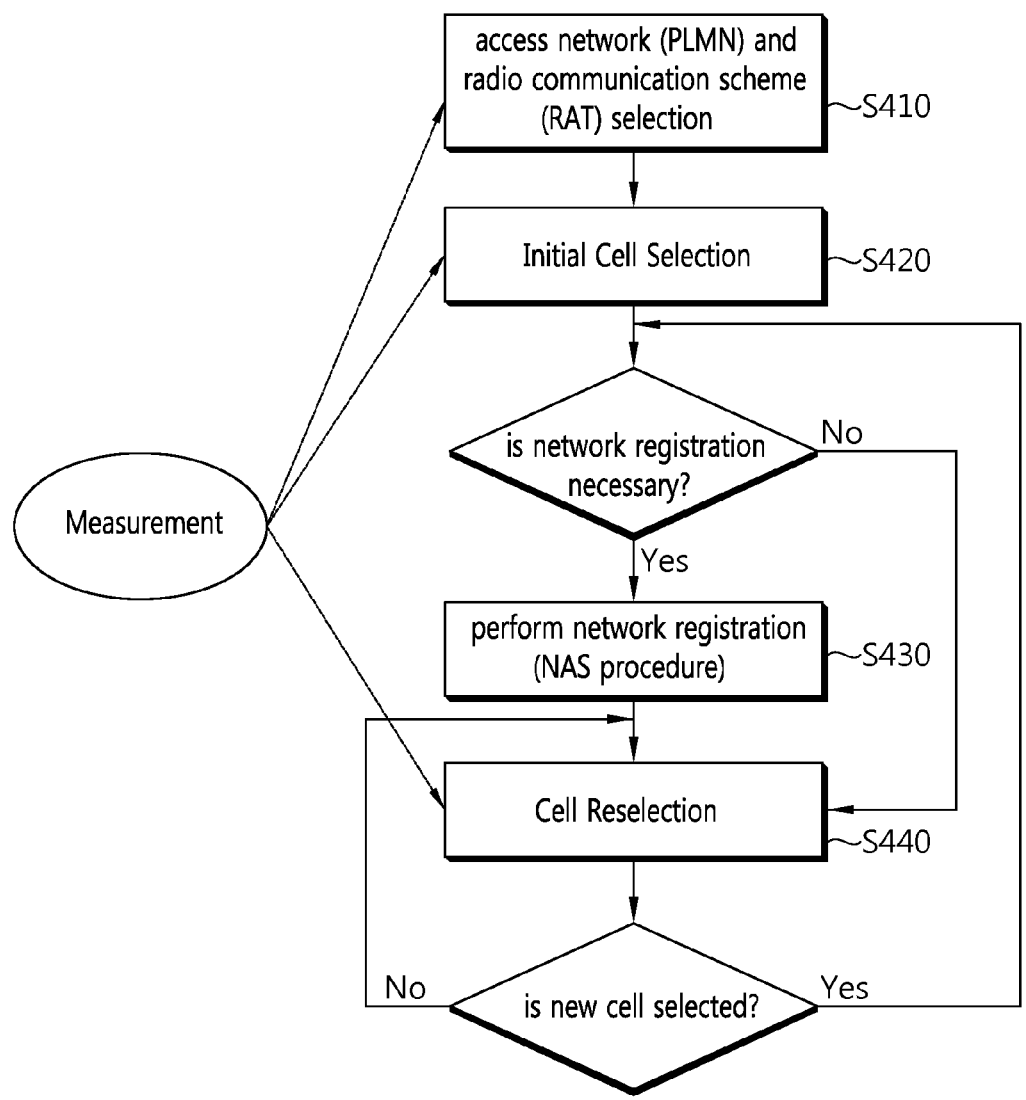
FIG. 4 is a flowchart showing an operation of a user equipment (UE) in a radio resource control (RRC)_idle state.

FIG. 4 is a flowchart showing an operation of a UE in an RRC_idle state. In a procedure shown in FIG. 4, a UE which is initially powered on is subjected to a cell selection process and is then registered to a network, and if necessary, a cell reselection is performed.

Referring to FIG. 4, the UE selects a radio access technology (RAT) for communicating with a public land mobile network (PLMN) which is a network from which the UE desires to receive a service (step S410). Information regarding the PLMN and the RAT may be selected by a user of the UE, or information stored in a universal subscriber identity module (USIM) may be used.

Among cells of which quality or signal strength measured with respect to a BS is greater than a specific value, the UE selects a cell having a greatest value (i.e., a cell selection) (step S420). This is an operation in which the UE which is powered on performs the cell selection, and may be referred to as an initial cell selection. The cell selection procedure is described below. After the cell selection, the UE receives system information periodically transmitted by the BS. The aforementioned specific value is a value defined in a system to ensure quality for a physical signal in data transmission/reception. Therefore, the value may vary depending on the RAT to be applied.

The UE performs a network registration procedure if a network registration is necessary (step S430). The UE registers its information (e.g., IMSI) to receive a service (e.g., paging) from the network. The UE does not register the information to the network whenever a cell is selected. Instead, the UE registers the information to the network if network information (e.g., tracking area identity (TAI)) received from system information is different from network information which is known to the UE.

The UE performs the cell reselection on the basis of an environment of a service provided from a cell or an environment of the UE, or the like (step S440). If a signal strength or quality value measured from a BS which provides a service to the UE is lower than a value measured from a BS of a neighboring cell, the UE selects one of different cells which provide a better signal characteristic than a cell of the BS to which the UE accesses. This process is called a cell re-selection to distinguish from the $2^{nd}$ step, that is, the initial cell selection. In this case, a temporal constraint is provided to prevent a cell from being frequently re-selected according to a change in a signal characteristic. The cell re-selection procedure is described in detail below.

Figure 5:
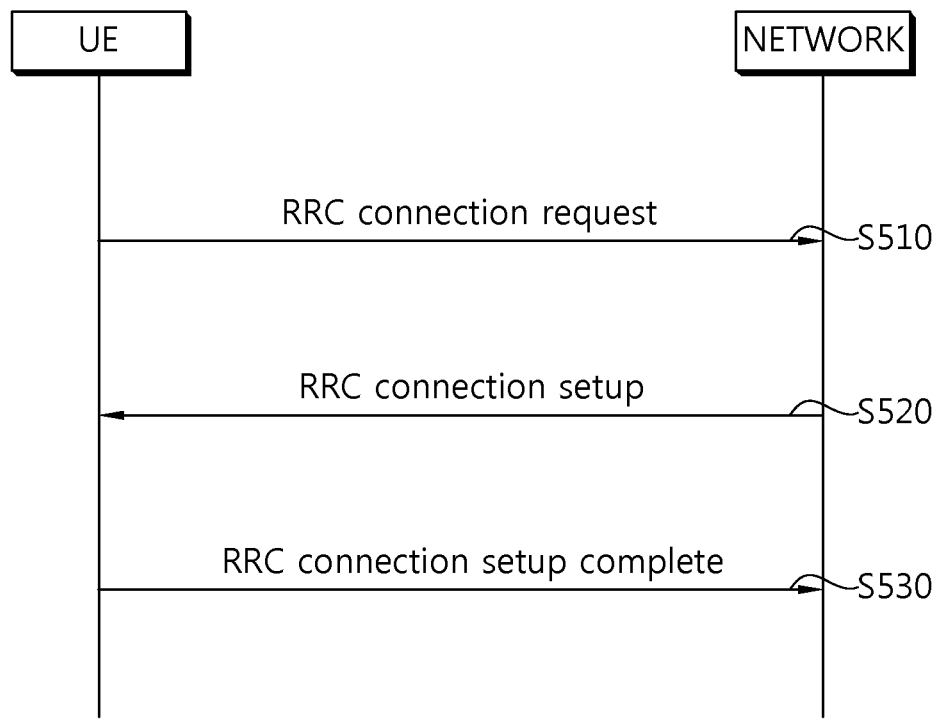
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC_connected mode.

The UE sends to the network an RRC connection setup complete message used to confirm successful completion of the RRC connection establishment (step S530).

Figure 6:
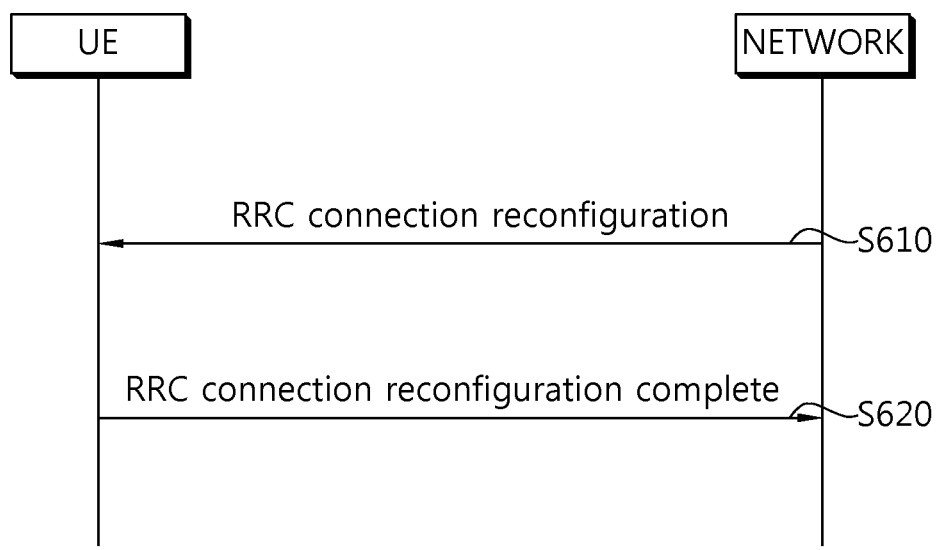
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

The following description relates to a public land mobile network (PLMN).

The PLMN is a network deployed and managed by a mobile network operator. Each mobile network operator manages one or more PLMNs. Each PLMN may be identified with a mobile country code (MCC) and a mobile network code (MNC). PLMN information of a cell is broadcast by being included in system information.

Various types of PLMNs may be considered by a UE in a PLMN selection, a cell selection, and a cell re-selection.

Home PLMN (HPLMN): PLMN having MCC and MNC which are matched with MCC and MNC of UE IMSI.

Equivalent HPLMN (EHPLMN): PLMN considered as equivalence of HPLMN.

Registered PLMN (RPLMN): PLMN of which a location registration is successfully complete.

Equivalent PLMN (EPLMN): PLMN considered as equivalence of RPLMN.

Each mobile service consumer subscribes to an HPLMN. When a normal service is provided to a UE by the HPLMN or an EHPLMN, the UE is not in a roaming state. On the other hand, when a service is provided to the UE by a PLMN other than the HPLMN/EHPLMN, the UE is in the roaming state, and the PLMN is called a visited PLMN (VPLMN).

When power is initially on, the UE searches for an available PLMN, and selects a suitable PLMN capable of receiving a service. The PLMN is a network deployed or managed by a mobile network operator. Each mobile network operator manages one or more PLMNs. Each PLMN may be identified with a mobile country code (MCC) and a mobile network code (MNC). PLMN information of a cell is broadcast by being included in system information. The UE attempts to register a selected PLMN. If the registration is successful, the selected PLMN is a registered PLMN (RPLMN). The network may signal a PLMN list to the UE, and PLMNs included in the PLMN list may be considered as the same PLMN as the RPLMN. The UE registered to the network must be always reachable by the network. If the UE is in an ECM_connected state (or RRC_connected state), the network recognizes that the UE is receiving a service. However, if the UE is in an ECM_idle state (or RRC_idle state), a UE situation is not valid in an eNB, but is stored in an MME. In this case, a location of the UE in the ECM_idle state is reported only to the MME with a granularity of a list of tracking areas (TAs). A single TA is identified with a tracking area identity (TAI) consisting of a PLMN identity to which the TA belongs and a tracking area code (TAC) which uniquely expresses a TA in the PLMN.

Subsequently, among cells provided by the selected PLMN, a cell having a signal quality and characteristic capable of providing a proper service to the UE is selected.

Next, a procedure for selecting a cell by a UE is described in detail.

If the UE is powered on or is camped on a cell, the UE may perform procedures for selecting/reselecting a cell having suitable quality in order to receive a service.

The UE in an RRC_idle state always needs to be ready to receive the service through the cell by selecting the cell having suitable quality. For example, the UE that has been just powered on must select the cell having the suitable quality so as to be registered to a network. If the UE that has stayed in an RRC_connected state enters the RRC_idle state, the UE must select a cell on which the UE itself is camped. As such, a process of selecting a cell satisfying a certain condition by the UE in order to stay in a service waiting state such as the RRC_idle state is called a cell selection. The cell selection is performed in a state where the UE does not currently determine a cell on which the UE itself is camped in the RRC_idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE are described in detail.

The cell selection process can be briefly classified into two processes.

One process is an initial cell selection process, and in this process, the UE does not have previous information on radio channels. Therefore, the UE searches for all radio channels to find a suitable cell. In each channel, the UE searches for a strongest cell. Subsequently, if a suitable cell satisfying cell selection criteria is found, the UE selects the cell.

Next, the UE may select a cell by utilizing stored information or by utilizing information which is broadcast from the cell. Therefore, a cell selection may be performed faster in comparison with an initial cell selection process. As long as a cell satisfying a cell selection criterion is found, the UE selects the cell. If it fails to find the suitable cell satisfying the cell selection criterion through this process, the UE performs the initial cell selection process.

After the UE selects a certain cell through the cell selection process, the signal strength and quality between the UE and the eNB may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may inform the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having a highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in the cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process is described.

A ranking criterion used to assign a priority to a cell is defined by Equation 1 below.

$$R_S = Q_{meas,s} + Q_{hyst}, R_n = Q_{meas,n} - Q_{offset} \quad \text{[Equation 1]}$$

Herein, $R_s$ denotes a ranking value of a serving cell, $R_n$ denotes a ranking criterion of a neighboring cell, $Q_{meas,s}$ denotes a quality value measured for the serving cell by the UE, $Q_{meas,n}$ denotes a quality value measured for the neighboring cell by the UE, $Q_{hyst}$ denotes a hysteresis value for ranking, and $Q_{offset}$ denotes an offset between two cells.

In the intra-frequency cell reselection, if the UE receives an offset $Q_{offsets,n}$ between the serving cell and the neighboring cell, $Q_{ffoset} = Q_{offsets,n}$. Otherwise, $Q_{ffoset} = 0$.

In the inter-frequency cell reselection, if the UE receives the offset $Q_{offsets,n}$, $Q_{offset} = Q_{offsets,n} + Q_{frequency}$. Otherwise, $Q_{offset} = Q_{frequency}$.

If the ranking criterion $R_s$ of the serving cell and the ranging criterion $R_n$ of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value $Q_{hyst}$ is used to give a hysteresis in the cell reselection.

The UE measures the ranking criterion $R_s$ of the serving cell and the ranking criterion $R_n$ of the neighboring cell according to the above equation. A cell having a greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

The following description relates to radio link monitoring (RLM).

A UE monitors downlink quality on the basis of a cell-specific reference signal to detect a downlink radio link quality of a PCell. The UE estimates the downlink radio link quality for the purpose of monitoring the downlink radio link quality of the PCell, and compares it with threshold values Qout and Qin. The threshold value Qout is defined as a level at which the downlink radio link cannot be reliably received, and this corresponds to a 10% block error rate of hypothetical PDCCH transmission by considering a PDFICH error. The threshold value Qin is defined as a downlink radio link quality level at which more reliable reception is possible than the level of Qout, and this corresponds to a 2% block error rate or hypothetical PDCCH transmission by considering the PCFICH error.

Now, a radio link failure (RLF) is described.

A UE persistently performs a measurement to maintain quality of a radio link with respect to a serving cell which receives a service. The UE determines whether a communication is possible in a current situation due to a quality deterioration of the radio link with respect to the serving cell. If the quality of the serving cell is significantly low and thus the communication is almost impossible, the UE determines the current situation as the RLF.

If it is determined as the RLF, the UE gives up maintaining of the communication with the current serving cell, selects a new cell through a cell selection (or cell re-selection) procedure, and attempts an RRC connection reestablishment to the new cell.

In the spec of 3GPP LTE, the followings are exemplified as a case in which a normal communication is impossible.

In a case where a UE determines that a downlink communication link quality has a significant problem on the basis of a radio quality measurement result of a physical layer of the UE (in a case where it is determined that quality of a PCell is low during RLM is performed).

In a case where it is determined that an uplink transmission has a problem due to a persistent failure in a random access procedure in a MAC sub-layer.

In a case where it is determined that an uplink transmission has a problem due to a persistent failure in an uplink data transmission in an RLC sub-layer.

In a case where it is determined that a handover fails.

In a case where a message received by the UE does not pass an integrity check.

Hereinafter, an RRC connection reestablishment procedure is described in a greater detail.

Figure 7:
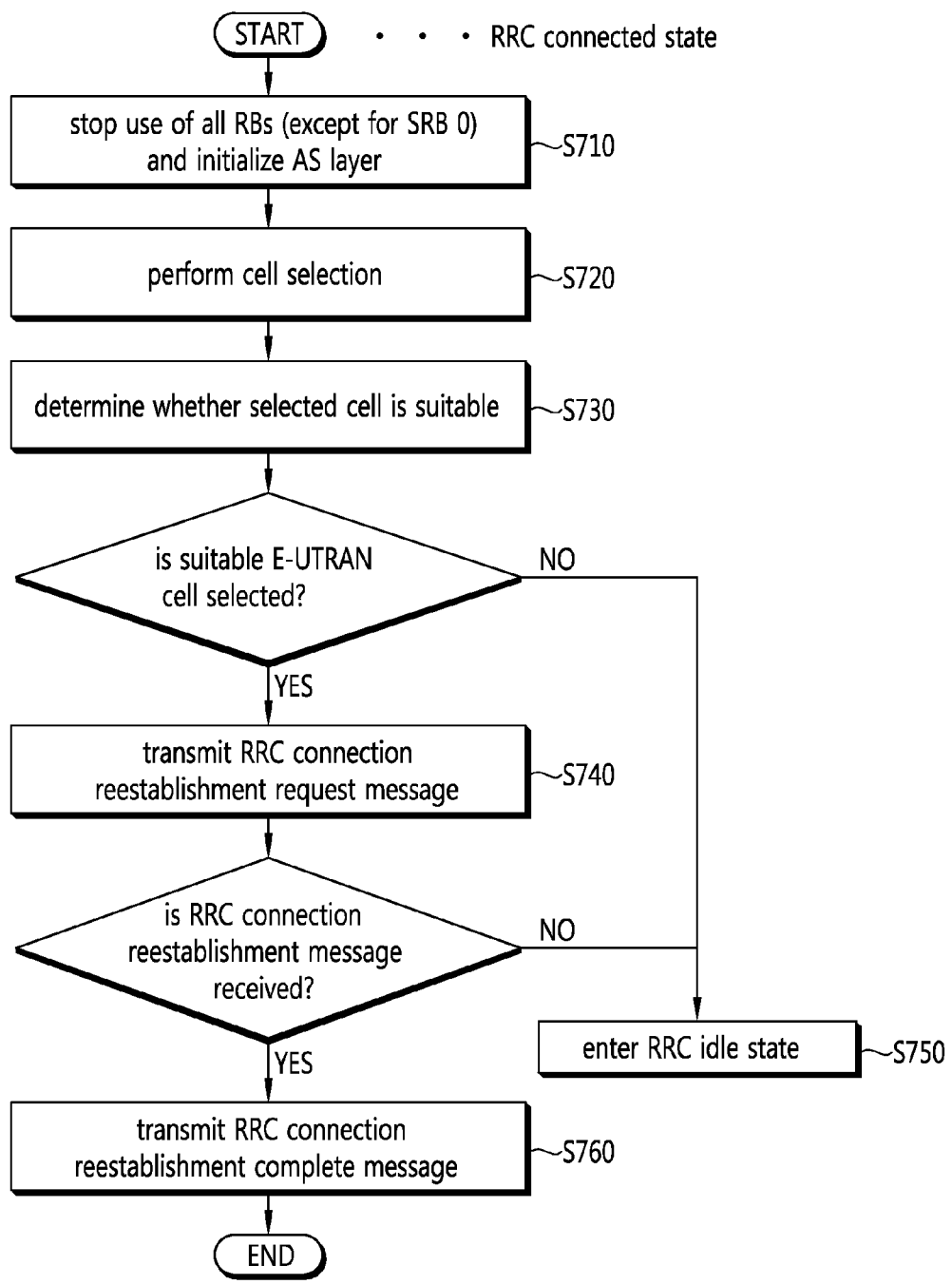
FIG. 7 shows an RRC connection reestablishment procedure.

FIG. 7 shows an RRC connection reestablishment procedure.

Referring to FIG. 7, a UE stops a use of all previously configured radio bearers except for an SRB 0 (i.e., a signal radio bearer #0), and initializes a variety of sub-layers of an access stratum (AS) (step S710). In addition, each sub-layer and a physical layer are configured as a default configuration. During such a process, the UE maintains an RRC_connected state.

The UE performs a cell selection procedure to perform an RRC connection reconfiguration procedure (step S720). During an RRC connection reestablishment procedure, the cell selection procedure may be performed in the same manner as the cell selection procedure which is performed by the UE in an RRC_idle state, even though the UE maintains the RRC_connected state.

After performing the cell selection procedure, the UE confirms system information of a corresponding cell and determines whether the cell is a suitable cell (step S730). If it is determined that the selected cell is a suitable E-UTRAN cell, the UE transmits an RRC connection reestablishment request message to the cell (step S740).

Meanwhile, if it is determined that the cell selected through the cell selection procedure for performing an RRC connection reestablishment procedure is a cell which uses another RAT other than E-UTRAN, the RRC connection reestablishment procedure is stopped, and the UE enters an RRC_idle state (step S750).

The UE may be implemented such that the determining of whether a cell is a suitable cell can be complete within a limited time through the cell selection procedure and through a reception of system information of the selected cell. For this, the UE may run a timer by starting the RRC connection reestablishment procedure. The timer may be stopped when it is determined that the UE selects the suitable cell. If the timer expires, the UE may regard that the RRC connection reestablishment procedure fails, and may enter the RRC_idle state. This timer is hereafter referred to as an RLF timer. In the LTE spec TS 36.331, a timer named as T311 may be utilized as the RLF timer. The UE may acquire a value which is set to this timer from system information of a serving cell.

If the RRC connection reestablishment request message is received from the UE and a request thereof is granted, the cell transmits an RRC connection reestablishment message to the UE.

Upon receiving the RRC connection reestablishment message from the cell, the UE reconfigures a PDCP sub-layer and an RLC sub-layer with respect to an SRB1. In addition, a variety of key values related to a security setup are re-calculated, and a PDCP sub-layer serving for a security is reconfigured with newly calculated security key values. In doing so, the SRB1 between the UE and the cell is open, and an RRC control message can be exchanged. The UE completes a restart of the SRB1, and transmits an RRC connection reestablishment complete message to the cell to report that the RRC connection reestablishment procedure is complete (step S760).

On the other hand, if the RRC connection reestablishment request message is received from the UE and the request thereof is not granted, the cell transmits an RRC connection reestablishment reject message to the UE.

If the RRC connection reestablishment procedure is successfully performed, the cell and the UE perform the RRC connection reconfiguration procedure. In doing so, the UE recovers a state before the RRC connection reestablishment procedure is performed, and thus a continuity of a service is ensured to a maximum extent possible.

Subsequently, an RLF report is described.

To support a mobility robustness optimization (MRO) of a network, when the RLF occurs or a handover failure occurs, the UE reports such a failure event to the network.

After an RRC connection reestablishment, the UE may provide the RLF report to an eNB. A radio measurement included in the RLF report may be used for a potential failure cause to identify coverage problems. This information may be used to exclude such events in an MRO evaluation as to an intra-LTE mobility connection failure so that the events are used again as an input for other algorithms.

If the RRC connection reestablishment fails or the UE cannot perform the RRC connection reestablishment, the UE may perform the reestablishment in an idle mode and thereafter may generate a valid RLF report for the eNB. For such a purpose, the UE may store a most recent RLF or handover failure related information, and may indicate to an LTE cell that the RLF report is valid whenever an RRC connection (re)establishment and a handover are performed thereafter, until the RLF report is forwarded by the network or during 48 hours after the RLF or handover failure is detected.

The UE maintains the information during a state transition and an RAT change. After returning to the LTE RAT, the UE indicates again that the RLF report is valid.

If the RLF report is valid in the RRC connection establishment procedure, it indicates that the UE experiences an interrupt such as a link failure and the RLF report caused by this failure is not yet delivered to the network. The RLF report from the UE includes the following information.

E-CGI of a last cell (in case of RLF) which provides a service to the UE or a handover target. If the E-CGI is not known, PCI and frequency information are used instead.

E-CGI of a cell for which a reestablishment is tried.

E-CGI of a cell which provides a service to the UE, for example, when a message 7 (RRC connection reconfiguration) is received by the UE in a last handover initialization.

Time elapsed from the last handover initialization to a link failure.

Information indicating whether the link failure is caused by an RLF or handover failure.

Radio measurements.

Location of a failure.

An eNB which receives an RLF failure from the UE may forward the report to an eNB which provides a service to the UE before the reported link failure. Radio measurements included in the RLF report may be used to identify coverage issues as a potential cause of the RLF. This information may be used to exclude such events from an MRO evaluation as to an intra-LTE mobility connection failure so that the events are sent aging as an input for other algorithms.

Hereinafter, a measurement and a measurement report are described.

It is necessary for a mobile communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like. A measurement for such a purposes is often referred to as a radio resource management (RRM) measurement.

To provide information which can be helpful for a network operation of a vender in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

If a UE in motion determines that quality of a specific area is significantly bad, the UE may report a measurement result and location information on cells having bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication vendor may perform a network operation by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of an eNB. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 2000 system conforming to the 3GPP2 standard.

Figure 8:
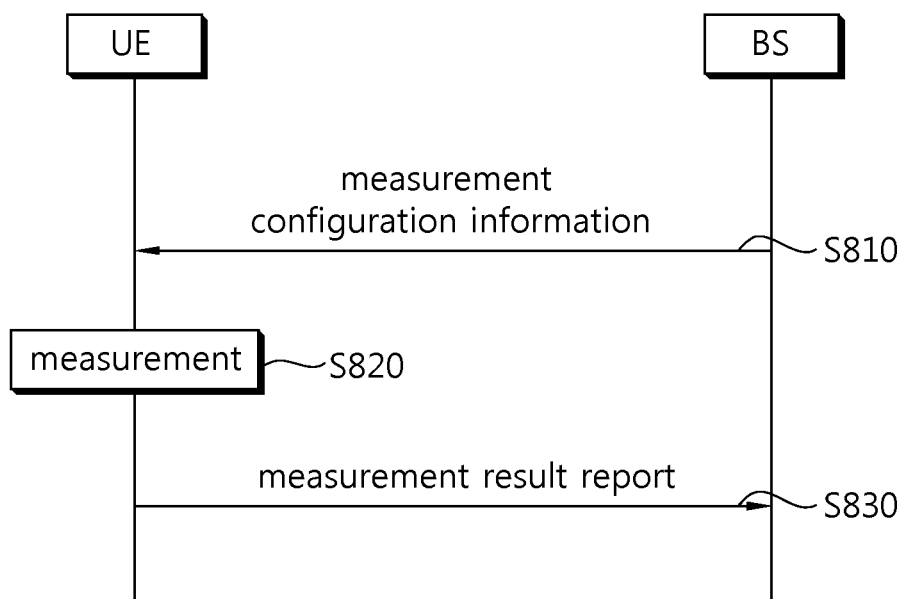
FIG. 8 is a flowchart showing a method of performing a measurement.

FIG. 8 is a flowchart showing a method of performing a measurement.

A UE receives measurement configuration information from a BS (step S810). A message including the measurement configuration information is referred to as a measurement configuration message. The UE performs the measurement based on the measurement configuration information (step S820). If a measurement result satisfies a report condition included in the measurement configuration information, the UE reports the measurement result to the BS (step S830). A message including the measurement result is referred to as a measurement report message.

Measurement configuration information may include the following information.

(1) Measurement object information: This information is in regards to an object for which a measurement is performed by the UE. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighbor cell having the same frequency band as a frequency band of a serving cell, the inter-frequency measurement object may indicate a neighbor cell having a different frequency band from a frequency band of the serving cell, and the inter-RAT measurement object may indicate a neighbor cell having a different RAT from an RAT of the serving cell.

(2) Reporting configuration information: This information is in regards to a report type and a report condition regarding when the UE reports a measurement result. The report condition may include information on a period or an event for triggering a report of the measurement result. The report type is information indicating a particular type according to which the measurement result is configured.

(3) Measurement identity information: This information is in regards to a measurement identity for determining when and in what type the UE will report a specific measurement object by associating the measurement object with a report configuration. Each measurement identity associates one measurement object with one report configuration. By configuring a plurality of measurement identities, not only one or more report configurations are associated with the same measurement object but also one or more measurement objects can be associated with the same report configuration. The measurement identity may be used as a reference number within a measurement report. The measurement identity information may be included in the measurement report message to indicate a specific measurement object for which the measurement result is obtained and a specific report condition according to which the measurement report is generated.

(4) Quantity configuration information: The quantity configuration information defines a measurement quantity, and defines associated filtering used for all event evaluations and related reports of measurement types thereof. One filter may be configured for each measurement quantity.

(5) Measurement gap information: This information is in regards to a measurement gap as a duration that can be used by the UE only for a measurement without consideration of data transmission with a serving cell when downlink transmission or uplink transmission is not scheduled.

To perform a measurement procedure, the UE has a measurement object list, a measurement report configuration list, and a measurement identity list.

In 3GPP LTE, the BS can assign only one measurement object to the UE with respect to one frequency band. Events for triggering a measurement report shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Report condition |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the UE satisfies the determined event, the UE transmits a measurement report message to the BS.

Figure 9:
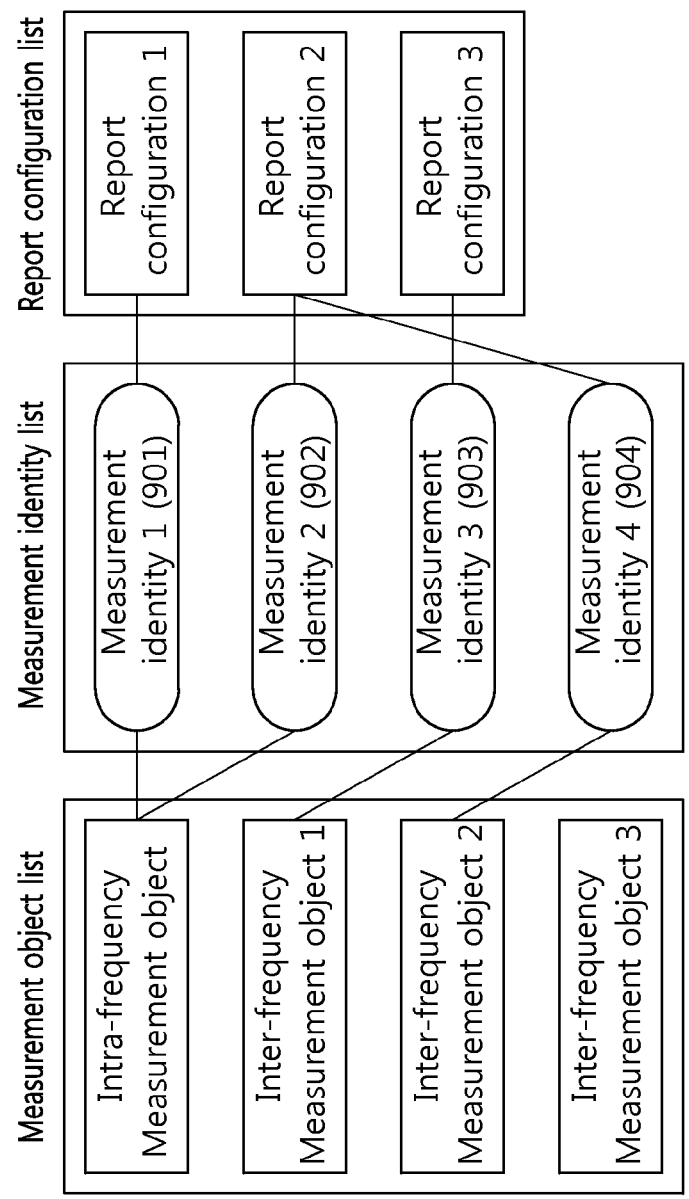
FIG. 9 shows an example of a measurement configuration assigned to a UE.

FIG. 9 shows an example of a measurement configuration assigned to a UE.

First, a measurement identity1 901 associates an intra-frequency measurement object with a report configuration 1. The UE performs an intra-frequency measurement. The report configuration 1 is used to determine a report type and a criterion for a measurement result report.

A measurement identity2 902 is associated with the intra-frequency measurement object similarly to the measurement identity1 901, and associates the intra-frequency measurement object with a report configuration 2. The UE performs an intra-frequency measurement. The report configuration 2 is used to determine a report type and a criterion for a measurement result report.

By using the measurement identity1 901 and the measurement identity2 902, the UE transmits a measurement result even if the measurement result on the intra-frequency measurement object satisfies any one of the report configuration 1 and the report configuration 2.

A measurement identity3 903 associates an inter-frequency measurement object 1 with a report configuration 3. When a measurement result on the inter-frequency measurement object 1 satisfies a report condition included in the report configuration 1, the UE reports the measurement result.

A measurement identity4 904 associates an inter-frequency measurement object 2 with the report configuration 2. When a measurement result on the inter-frequency measurement object 2 satisfies a report condition included in the report configuration 2, the UE reports the measurement result.

Meanwhile, the measurement object, the report configuration, and/or the measurement identity can be added, modified, and/or deleted. To instruct such operations, the BS may transmit to the UE a new measurement configuration message or a measurement configuration modification message.

Figure 10:
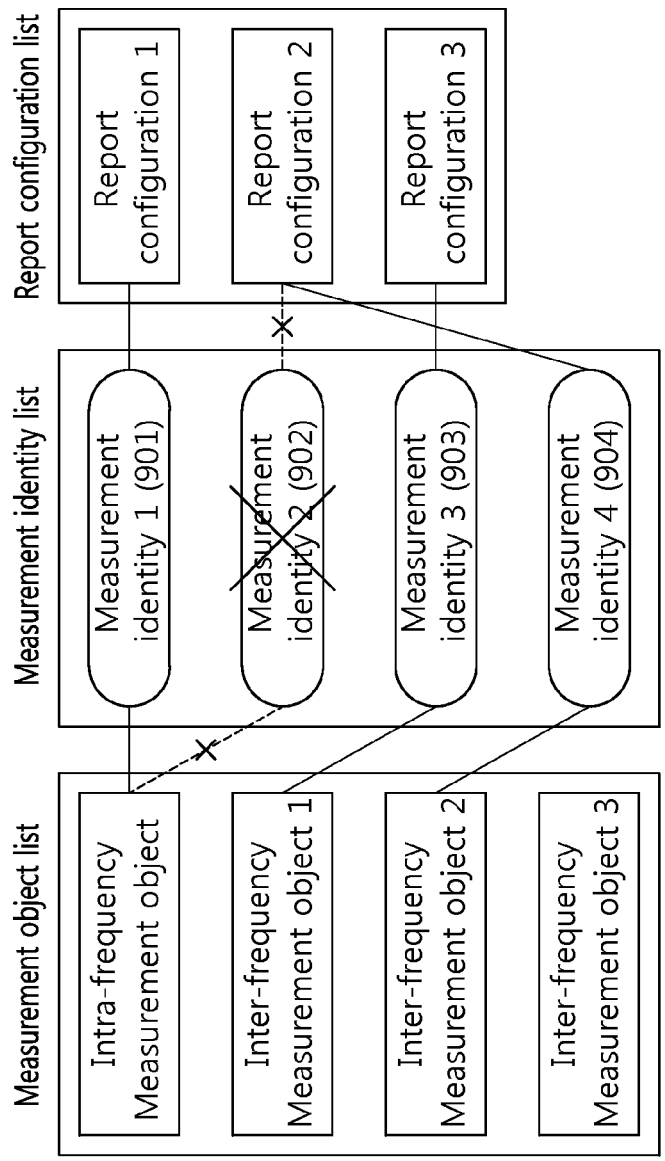
FIG. 10 shows an example of deleting a measurement identity.

FIG. 10 shows an example of deleting a measurement identity. When a measurement identity2 902 is deleted, a measurement on a measurement object associated with the measurement identity2 902 is suspended, and a measurement report is not transmitted. A report configuration or a measurement object associated with the deleted measurement identity may not be modified.

Figure 11:
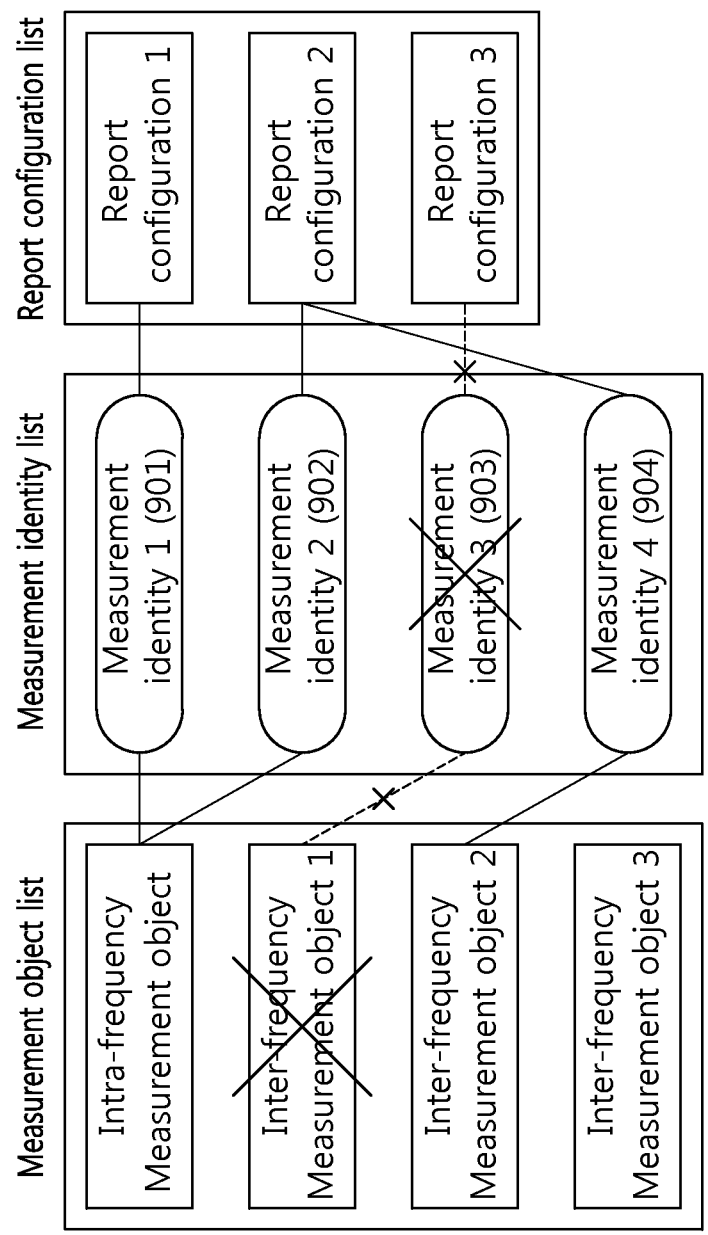
FIG. 11 shows an example of deleting a measurement object.

FIG. 11 shows an example of deleting a measurement object. When an inter-frequency measurement object 1 is deleted, a UE also deletes an associated measurement identity3 903. Measurement on the inter-frequency measurement object 1 is suspended, and a measurement report is not transmitted. However, a report configuration associated with the deleted inter-frequency measurement object 1 may not be modified or deleted.

When the report configuration is deleted, the UE also deletes an associated measurement identity. The UE suspends measurement on an associated measurement object according to the associated measurement identity. However, a measurement object associated with the deleted report configuration may not be modified or deleted.

A measurement report may include a measurement identity, a measured quality of a serving cell, and a measurement result of a neighboring cell. The measurement identity identifies a measurement object for which the measurement report is triggered. The measurement result of the neighboring cell may include a measured quality and a cell identity of the neighboring cell. The measured quality may include at least one of a reference signal received power (RSRP) and a reference signal received quality (RSRQ).

Subsequently, a tracking collection entity (TCE) is described.

A subscriber and equipment trace provides very specific information on a cell level with respect to one or more specific mobiles. This data may be an additional source for information regarding a capability measurement, and allows more intensified monitoring and optimized managements. Unlike the capability measurement which is always a source of information, a trace may be activated by a user's request/necessity during a restricted time duration for a purpose of a specific analysis. The trace plays a very important role in operations such as a determination of a fundamental cause of a mobile which operates erroneously, an improved repair of a malfunction, a resource usage and quality optimization, a radio frequency (RF) coverage control, a capacity improvement, an analysis on a disconnection during a call, and a configuration of a UMTS procedure between a core network and a UTRAN.

A function for logging data on an interface in a call level for a service initiated by a specific user (e.g., IMSI (International Mobile Subscriber Identity)) or a mobile type (e.g. IMEI (International Mobile Equipment Identity) or IMEISV (IMEI and Software Version)) or a user allows to acquire information which cannot be estimated from a capability measurement such as a recognition of final user QoS during a call (e.g., requested QoS vs. provided QoS), a correlation between protocol messages and RF measurements, or an information processing mutual management between specific mobile venders. Traced data is collected in a TCE.

Now, minimization of driving tests (MDT) is described.

The MDT allows a UE to perform a measurement and to report a result thereof, instead of performing a conventional drive test for measuring a cell quality by vendors by using an automobile for a cell coverage optimization. A coverage varies depending on a location of a BS, a deployment of neighboring buildings, and a user's usage environment. Therefore, the vender needs to perform the drive test periodically, which consumes a lot of costs and resources. The MDT for measuring the coverage by the vender by using the UE is proposed to overcome such a shortcoming.

The vendor may aggregate MDT measurement values received from several UEs to create a coverage map which indicates whether a service can be provided across overall areas served by the vender and a distribution of a service quality, and may use it for a network management and optimization. For example, if a coverage problem of a specific area is reported from a UE, the vender may extend a cell coverage of the area by increasing transmission power of a BS which provides a service to the area. According to this method, a time and cost required for the network optimization can be minimized.

The MDT is created on the basis of a framework of a trace function which is one of operator's tools for operation, administration, and maintenance (OAM). Since the trace function provides the operator with a capability of tracing and logging behaviors of the UE, it is possible to determine a main cause of a malfunction in a UE side. Traced data is collected on a network, which is called a trace collection entity (TCE). For an analysis and an evaluation, the operator uses data collected in the TCE. The trace function used for the MDT includes signaling based on the trace function and managing based on the trace function. The signaling based on the trace function is used to activate an MDT task towards a specific UE, whereas the managing based on the trace function is used to activate the MDT function without being limited to the specific UE.

The MDT may be classified into two types, i.e., a logged MDT and an immediate MDT, according to whether the UE reports measured and stored log data on a non-real time basis or on a real time basis. The logged MDT is a method in which the UE performs an MDT measurement and thereafter logs the data, and transmits it to a network at a later time. On the other hand, the immediate MDT is a method in which, after an MDT measurement, data thereof is immediately transmitted to the network. According to the logged MDT, the UE performs the MDT measurement in an RRC_idle state, whereas according to the immediate MDT, the UE performs the MDT measurement in an RRC_connected state. Hereinafter, the logged MDT is described in a greater detail.

Figure 12:
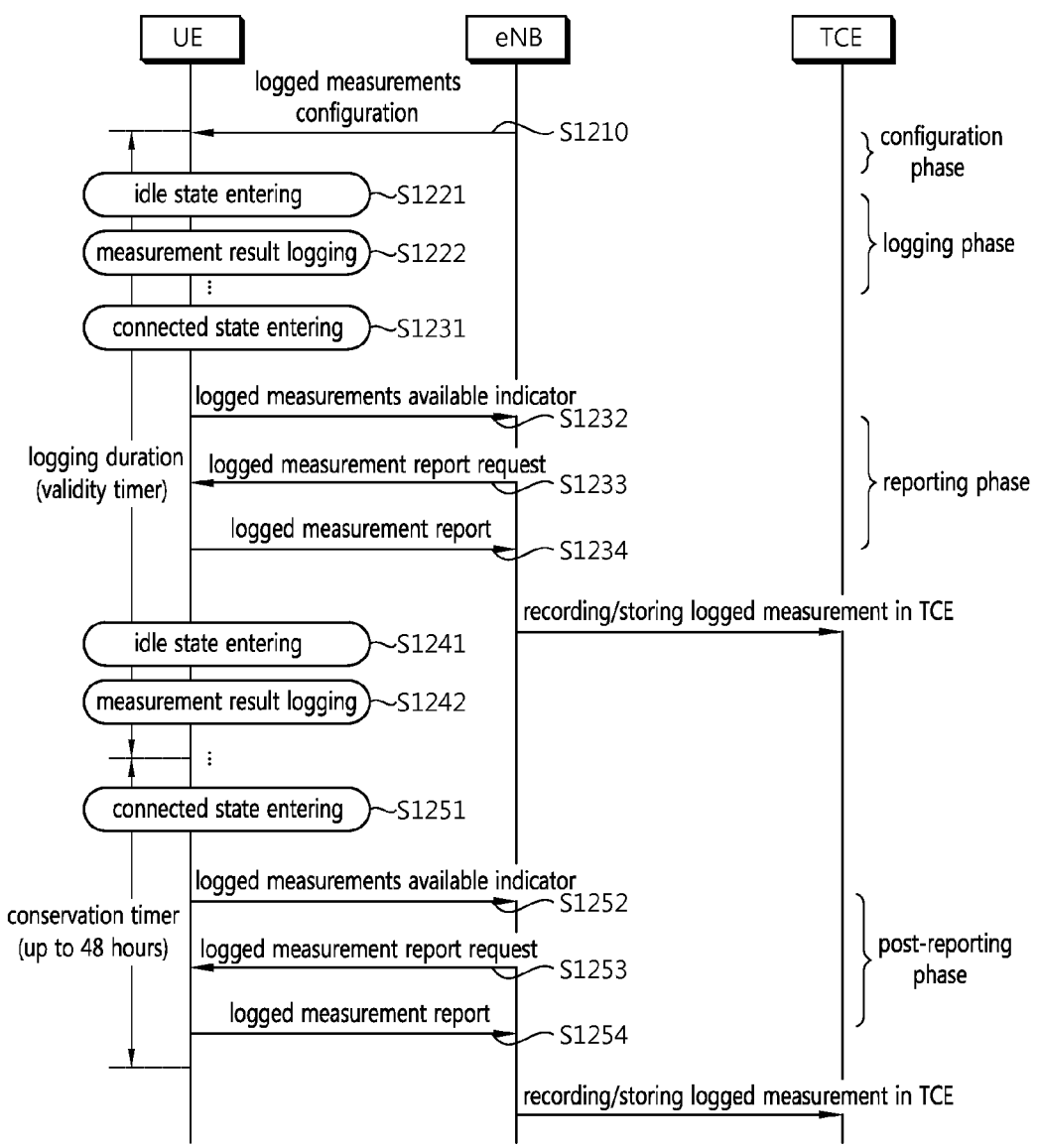
FIG. 12 is a flowchart showing a method of performing a logged minimization of driving tests (MDT).

FIG. 12 is a flowchart showing a method of performing a logged MDT.

Referring to FIG. 12, a UE receives a logged measurements configuration (step S1210). The logged measurements configuration may be transmitted through a downlink control channel by being included in an RRC message. The logged measurements configuration may include at least one of a TCE ID, a reference time for performing logging, a logging duration, a logging interval, information on an area configuration, and an MDT PLMN list. The logging interval indicates an interval for storing a measurement result. The logging duration indicates a duration in which the UE performs the logged MDT. The reference time indicates a time used as a reference of the duration for performing the logged MDT. The area configuration indicates an area in which the UE is requested to perform the logging.

The MDT PLMN list may include at least one PLMN in which the UE can perform measuring and logging. The MDT PLMN list may be configured to include a sub-set of at least one EPLMNs indicated by an EPLMN list reported from a network to the UE through NAS signaling. The MDT PLMN list may be included in the logged measurements configuration, and may include information for identifying a PLMN. As described above, the information for identifying the PLMN may include an MCC and MNC of the PLMN.

Meanwhile, the UE starts a validity timer upon receiving the logged measurements configuration. The validity timer implies a lifetime of the logged measurements configuration, and this may be specified by information on the logging duration. The duration of the validity timer may indicate not only a valid lifetime of the logged measurements configuration but also a validity of measurement results of the UE.

As described above, a procedure in which the UE configures a logged measurement and an overall procedure based thereon is performed is called a configuration phase.

When the UE enters an RRC_idle state (step S1221), the UE logs a measurement result during a validity timer is running (step S1222). A measurement result value may be RSRP, RSRQ, RSCP (received signal code power), Ec/No, etc. Hereinafter, information obtained by logging the measurement result is called logged measurements and/or a measurement result log. A time duration in which the UE logs the measurement result at least one time is called a logging phase.

The operation in which the UE performs the logged MDT based on the logged measurements configuration may vary depending on a location in which the UE exists.

Figure 13:
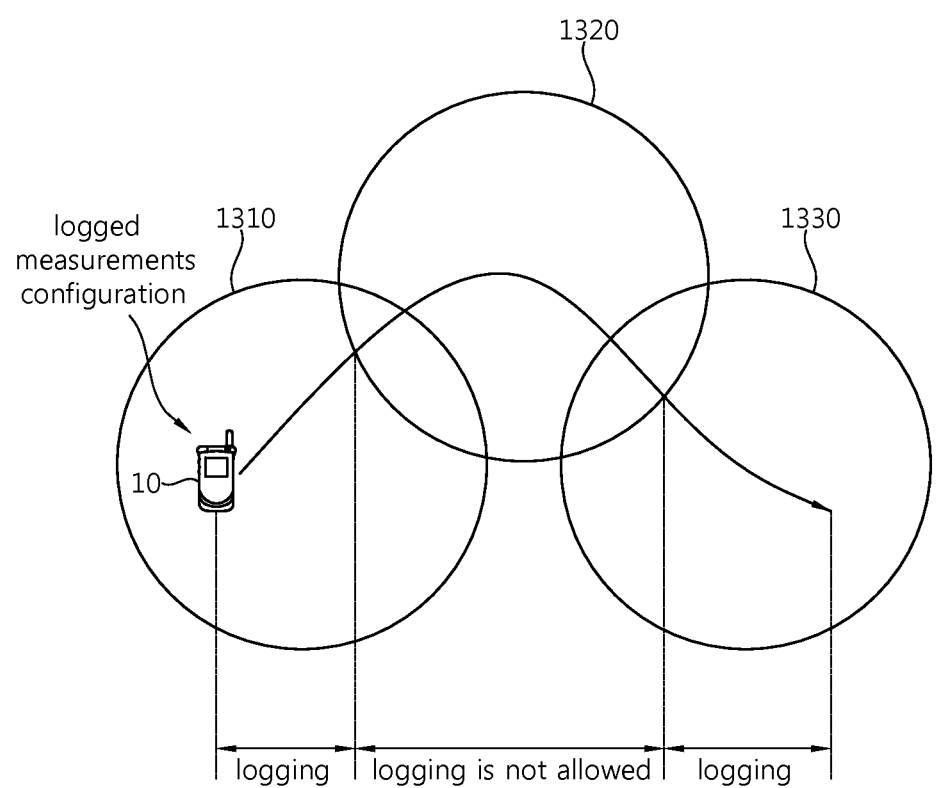
FIG. 13 shows an example of a logged MDT based on a logging area.

FIG. 13 shows an example of a logged MDT based on a logging area.

A network may configure the logging area which is an area in which a UE must perform logging. The logging area may be expressed as a cell list or may be expressed as a tracking area/location area list. If the logging area is configured to the UE, the UE stops the logging when it is out of the logging area.

Referring to FIG. 13, a $1^{st}$ area 1310 and a $3^{rd}$ area 1330 are areas configured as a logging area, and a $2^{nd}$ area 1320 is an area in which logging is not allowed. The UE performs the logging in the $1^{st}$ area 1310, but does not perform the logging in the $2^{nd}$ area 1320. The UE performs again the logging when moving from the $2^{nd}$ area 1320 to the $3^{rd}$ area 1330.

Figure 14:
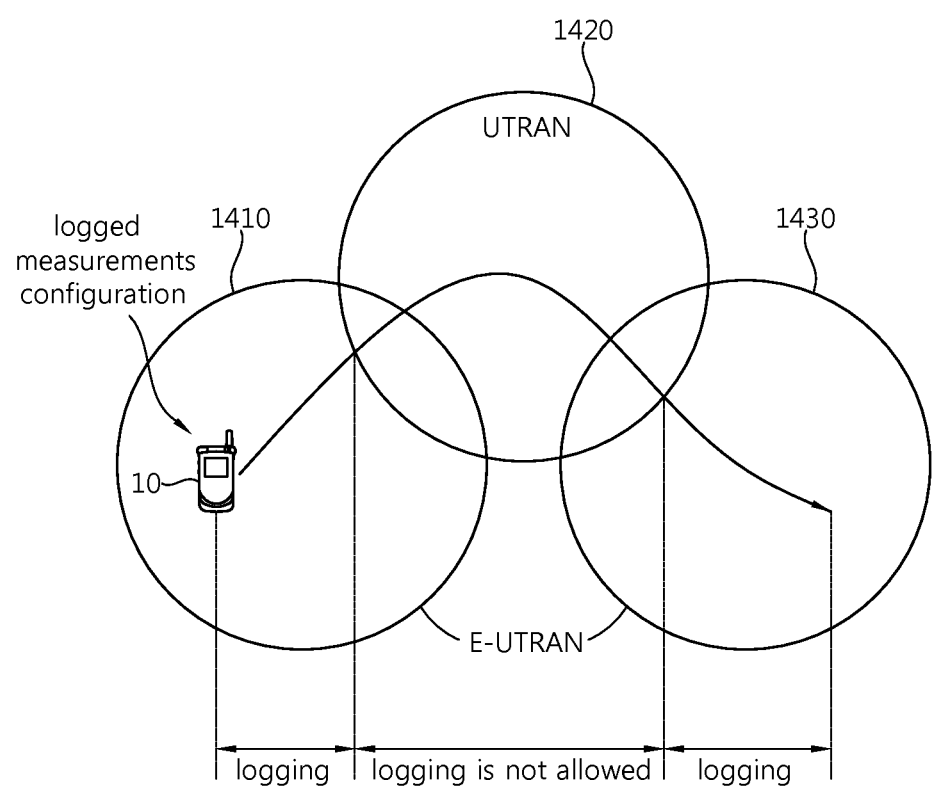
FIG. 14 shows an example of a logged MDT based on a radio access technology (RAT) change.

FIG. 14 shows an example of a logged MDT based on an RAT change.

A UE performs logging only when the UE camps on an RAT which receives a logged measurements configuration, and stops the logging in other RATs. However, the UE may log cell information of another RAT other than the RAT on which the UE camps.

A $1^{st}$ area 1410 and a $3^{rd}$ area 1430 are E-UTRAN areas, and a $2^{nd}$ area 1420 is a UTRAN area. The logged measurements configuration is received from the E-UTRAN. The UE does not perform an MDT measurement when entering the $2^{nd}$ area 1420.

Measuring and logging are restricted according to a logging area configured through the logged measurements configuration as shown in FIG. 13 and FIG. 14. In addition thereto, the UE may perform measuring and logging on the basis of an MDT PLMN list provided through the logged measurements configuration. The UE may perform measuring and logging with respect to at least one cell based on at least one EPLMN indicated by an RPLMN and MDT PLMN list when receiving a specific PLMN, that is, a logged measurements configuration, based on the MDT PLMN list.

Referring back to FIG. 12, the UE enters the RRC_connected state (step S1231), and if the logged measurement to be reported is present, the UE reports to the eNB that the logged measurement to be reported is present (step S1232). When an RRC connection is established, or the RRC connection is reestablished, or the RRC connection is reconfigured, the UE may report to the eNB that the logged measurement is present. In addition, if the UE performs a handover, it may be reported to a handover target cell that the logged measurement is present. The operation in which the UE reports to the eNB that the logged measurement is present may be an operation of transmission by allowing an RRC message transmitted from the UE to the eNB to include a logged measurements available indicator which is indication information for reporting that the logged measurement is present. The RRC message may be an RRC connection configuration complete message, an RRC connection reestablishment complete message, an RRC reconfiguration complete message, or a handover complete message.

Upon receiving a signal for reporting that the logged measurement is present from the UE, the eNB requests the UE to report the logged measurement (step S1233). The operation of requesting to report the logged measurement may be an operation of transmission by allowing an RRC message to include a logged measurement report request parameter regarding information which indicates the request. The RRC message may be a UE information request message.

When the UE is requested from the eNB to report the logged measurement, the logged measurement is reported to the eNB (step S1234). The operation of reporting the logged measurement to the eNB may be an operation of transmission by allowing an RRC message to include a logged measurements report including logged measurements. The RRC message may be a UE information report message. When reporting the logged measurement, the UE may report the entirety of the logged measurement owned by the UE to the eNB at a reporting time or may report a part thereof to the eNB. When reporting only the part thereof, the reported part may be discarded.

As described above, a phase of performing a process in which the UE reports to the eNB that the logged measurement is present, receives a request to report from the eNB, and reports the logged measurement based thereon is called a reporting phase.

What is measured by the UE during the logged MDT is performed is primarily related to a radio environment. The MDT measurement may include a cell identity, a cell's signal quality and/or signal strength. The MDT measurement may include a measurement time and a measurement place. The table below exemplifies a content logged by the UE.

TABLE 2

| Parameter(set) | Description |
| --- | --- |
| Serving cell identity | Global cell identity of Serving cell |
| Measured results of serving cell | Measured RSRP of serving cell |
| | Measured RSRQ of serving cell |
| Measured results of neighbor cell | Cell Identities of measured E-UTRA cells, Measured results of E-UTRA cells |
| | Cell Identities of measured UTRA cells, Measured results of UTRA cells |
| | Cell Identities of measured GERAN cells, Measured results of GERAN cells |
| | Cell Identities of measured CDMA 2000 cells, Measured results of CDMA 2000 cells |
| Time stamp | The moment of logging measurement results, calculated as {current time minus absoluteTimeStamp} in second |
| location information | Detailed location information at the moment of logging |

Information logged at different logging times may be stored by being classified according to different log entries as described below.

Figure 15:
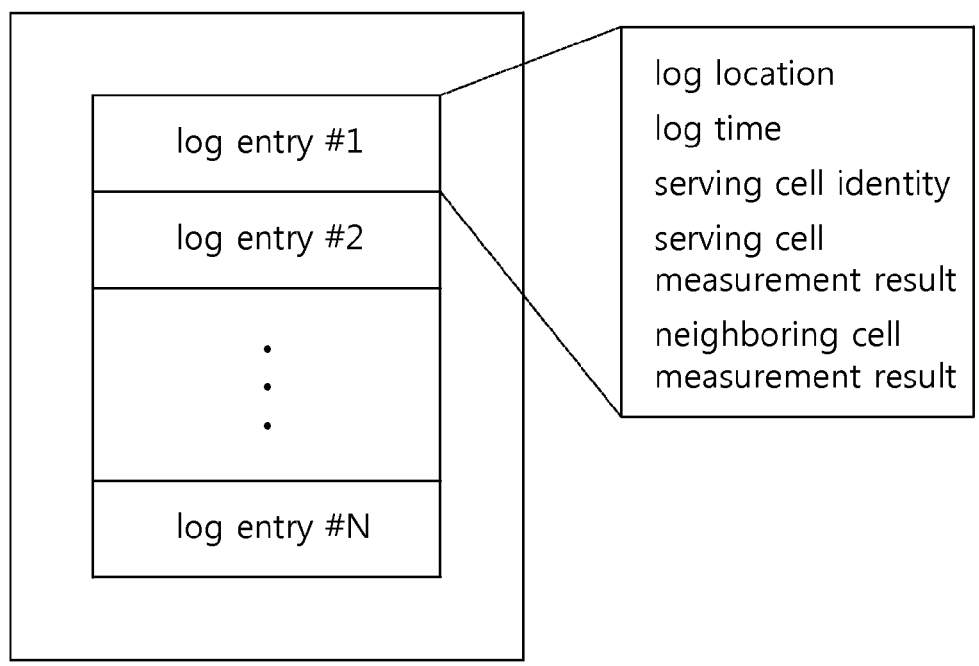
FIG. 15 shows an example of a logged measurement.

FIG. 15 shows an example of a logged measurement.

The logged measurement includes one or more log entries.

The log entry includes a logging location, a logging time, a serving cell identity, a serving cell measurement result, and a neighbor cell measurement result.

The logging location indicates a location measured by the UE. The logging time indicates a time measured by the UE. Information logged at different logging times is stored in different log entries.

The serving cell identity may include a cell identity at a layer 3, which is called a global cell identity (GCI). The GCI is a set of a physical cell identity (PCI) and a PLMN identity.

Meanwhile, the UE may perform logging by analyzing indicators related to a UE performance in addition to the radio environment. For example, the indicator may include a throughput, an erroneous transmission/reception rate, etc.

Referring back to FIG. 12, the aforementioned logging phase and reporting phase may be present in plural times within a logging duration (steps S1241 and S1242).

When the logged measurement is reported, the eNB may record/store the logged measurement in a TCE.

After a validity timer expires, that is, after a logging duration elapses, if the UE still has the logged measurement which is not yet reported, the UE performs a procedure of reporting the logged measurement to the eNB. A phase in which an overall procedure for this is performed is called a post-reporting phase.

The UE discards a logged measurement configuration after the logging duration ends, and starts a conservation timer. After the logging duration ends, the UE stops the MDT measurement. However, a measurement which has already been logged is not discarded but is maintained. The conservation timer indicates a lifetime of the remaining logged measurement.

If the UE enters an RRC_connected state before the conservation timer expires (step S1251), the logged measurement which is not yet reported may be reported to the eNB. In this case, the aforementioned procedure of reporting the logged measurement may be performed (steps S1252, S1253, S1254). When the conservation timer expires, the remaining logged measurement may be discarded. When the logged measurement is reported, the eNB may record/store the logged measurement in a TCE.

The conservation timer may be configured in advance to the UE by fixing to a predetermined value to the UE. For example, a value of the conservation timer may be 48 hours. Alternatively, the value of the conservation timer may be delivered to the UE by being included in the logged measurements configuration, or may be delivered to the UE by being included in another RRC message.

Meanwhile, when a new logged measurements configuration is delivered to the UE, the UE may update the old logged measurements configuration to the newly obtained logged measurements configuration. In this case, a validity timer may be restarted from a time at which the logged measurements configuration is newly received. In addition, the logged measurement based on the old logged measurements configuration may be discarded.

As described above, a logged MDT performed by the UE may be implemented by measuring and logging on the basis of an MDT PLMN list included in the logged measurements configuration. Meanwhile, an EPLMN list for the UE may be newly configured during the UE in motion performs the logged MDT in an RRC_idle state. In addition, the MDT PLMN list for the UE may also be newly configured. In this case, there is a discussion on a validity of a log entry included in the logged measurement acquired by the UE through logging until the MDT PLMN list and/or the EPLMN list are changed.

1) In a case where the EPLMN list is changed.

If the EPLMN list for the UE is changed through NAS signaling, there may be a problem regarding a validity of a log entry logged until the change occurs. At least one PLMN indicated by the MDT PLMN list is configured with a sub-set of PLMNs indicated by the EPLMN list. This is because, when the EPLMN list is changed, a specific PLMN in a previously configured MDT PLMN list may not be included in the changed EPLMN list. Therefore, a logged entry related to the PLMN may be no longer valid.

2) In a case where the MDT PLMN list is changed.

If a logged measurement configuration is newly configured, the UE may discard the old logged measurements configuration and may perform a logged MDT according to a new logged measurements configuration. However, optionally, only the MDT PLMN list in the logged measurement configuration may be newly configured, and the UE may perform the old logged MDT operation according to a new MDT PLMN list. When the MDT PLMN list is newly provided, the MDT PLMN list may be implemented with information for providing both an MCC and MNC for a specific PLMN, or may be implemented with information for providing the MCC or the MNC for the specific PLMN. If the MCC or the MNC is provided, the UE may identify a corresponding PLMN through a reference PLMN as described above. A log entry related to a PLMN not included in the new MDT PLMN list may be no longer valid.

In the determining of the validity of the log entry, if a PLMN included in the old EPLMN list is not included in the new EPLMN list, the UE may determine that a log entry for the PLMN is invalid. Since the MDT PLMN list is generally implemented with a sub-set of PLMNs included in the EPLMN list, if a PLMN related to the log entry is not included in the new EPLMN list, the UE may determine that the log entry is invalid.

In addition, if the PLMN included in the old MDT PLMN list is not included in the new MDT PLMN list, the UE may determine that a log entry for the PLMN is invalid. That is, if the PLMN related to the log entry is not included in the new MDT PLMN list, the UE may determine that the log entry is invalid.

If the EPLMN list and/or the MDT PLMN list are changed and thus it is determined that a specific log entry is no longer valid as described above, the UE may report a logged measurement including only a valid log entry and may discard an invalid log entry. Meanwhile, the method in which the UE discards the invalid log entry and reports the valid log entry to the network may be provided as various embodiments, which will be described below in detail with reference to the drawings.

Figure 16:
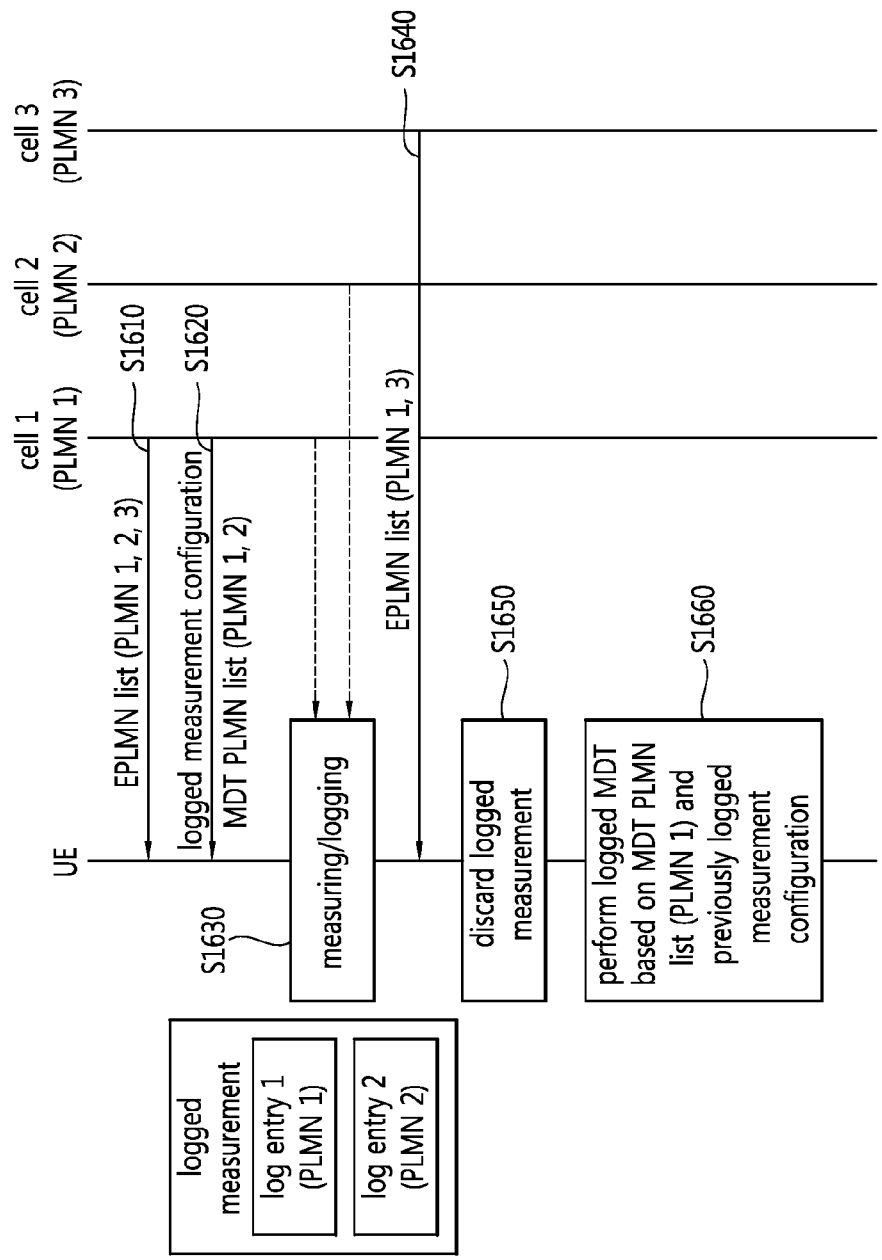
FIG. 16 shows an example of a method of performing a logged MDT according to an embodiment of the present invention.

FIG. 16 shows an example of a method of performing a logged MDT according to an embodiment of the present invention. In the example of FIG. 16, it is assumed that a cell 1, a cell 2, and a cell 2 are managed based on a PLMN 1, a PLMN 2, and a PLMN 3, respectively.

Referring to FIG. 16, a UE acquires an EPLMN list from the cell 1 (step S1610). The EPLMN list may include the PLMNs 1, 2, and 3. The UE receives a logged measurement configuration from the cell 1 (step S1620). The logged measurement configuration may include an MDT PLMN list, and the MDT PLMN list may include the PLMNs 1 and 2.

The UE performs measuring and logging based on the received logged measurements configuration (step S1630). The UE performs measuring on the cell 1 based on the PLMN 1, and logs a measurement result. The UE performs measuring on the cell 2 based on the PLMN 2 and logs a measurement result.

The UE acquires a new EPLMN list from the cell 3 (step S1640). A newly configured EPLMN list may include the PLMNs 1 and 3.

Upon receiving a new EPLMN including a PLMN different from an old EPLMN list, the UE discards a logged measurement (step S1650).

The UE which discards the logged measurement performs a logged MDT (step S1660).

The UE may restart the logged MDT. In this case, the UE performs a previously stored logged measurement configuration, and an MDT PLMN list may be used by being reconfigured based on a newly acquired EPLMN list. An MDT PLMN list to be newly applied may be reconfigured to include at least one remaining PLMN other than a PLMN not included in the newly acquired EPLMN list among PLMNs included in the old MDT PLMN list. In the present example, the MDT PLMN list used when the UE performs the logged MDT may include the PLMN 1, and the PLMN 2 is excluded.

The UE may reconfigure the MDT PLMN list on the basis of the newly acquired EPLMN list, and may subsequently perform the logged MDT by using the MDT PLMN list. Likewise, the reconfigured MDT PLMN list may include the PLMN 1, and the PLMN 2 is excluded.

Meanwhile, upon receiving the new EPLMN list, the UE may discard the logged measurements configuration, and may report the logged measurement to a network after stopping the performing of the logged MDT.

According to the example of FIG. 16, since the UE discards the logged measurements configuration as the new EPLMN list is acquired, a log entry which is no longer valid may be discarded.

Figure 17:
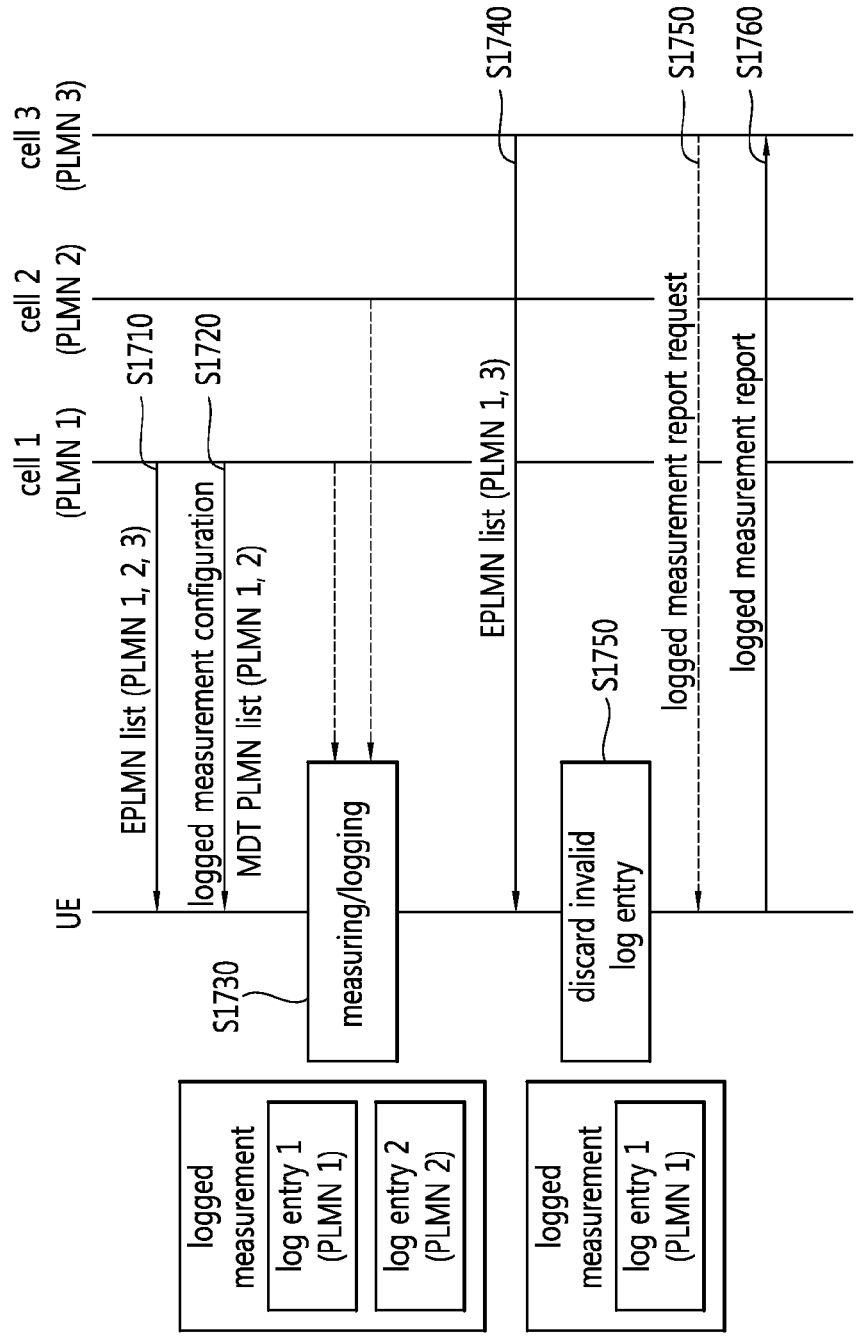
FIG. 17 shows another example of a method of performing a logged MDT according to an embodiment of the present invention.

FIG. 17 shows another example of a method of performing a logged MDT according to an embodiment of the present invention. In the example of FIG. 17, it is assumed that a cell 1, a cell 2, and a cell 2 are managed based on a PLMN 1, a PLMN 2, and a PLMN 3, respectively.

Referring to FIG. 17, a UE acquires an EPLMN list from the cell 1 (step S1710). The EPLMN list may include the PLMNs 1, 2, and 3. The UE receives a logged measurement configuration from the cell 1 (step S1720). The logged measurement configuration may include an MDT PLMN list, and the MDT PLMN list may include the PLMNs 1 and 2.

The UE performs measuring and logging based on the received logged measurements configuration (step S1730). The UE performs measuring on the cell 1 based on the PLMN 1, and logs a measurement result. The UE performs measuring on the cell 2 based on the PLMN 2 and logs a measurement result.

The UE acquires a new EPLMN list from the cell 3 (step S1740). A newly configured EPLMN list may include the PLMNs 1 and 3.

As the new EPLMN list is received, the UE discards an invalid log entry included in the logged measurement (step S1750). The UE may determine that a log entry related to a PLMN not included in the newly acquired EPLMN list among at least one PLMN included in the MDT PLMN list is no longer valid. That is, if the PLMN of the log entry is not included in the newly acquired EPLMN list, it may be determined that the log entry is no longer valid. Therefore, the log entry related to the PLMN may be excluded in the log measurement. In the present example, the UE may discard the log entry 2 which is a log entry related to the PLMN 2.

Upon discarding the invalid log entry, the UE may persistently perform the logged MDT operation on the basis of the previously logged measurements configuration and reconfigured MDT PLMN list. The reconfigured MDT PLMN list may be reconfigured to include at least one remaining PLMN other than the PLMN not included in the newly acquired EPLMN list among the PLMN included in the old MDT PLMN list.

Thereafter, the UE establishes an RRC connection with a network, and if it is required to report a logged measurement from the network (step S1750), may report the logged measurement (step S1760).

Figure 18:
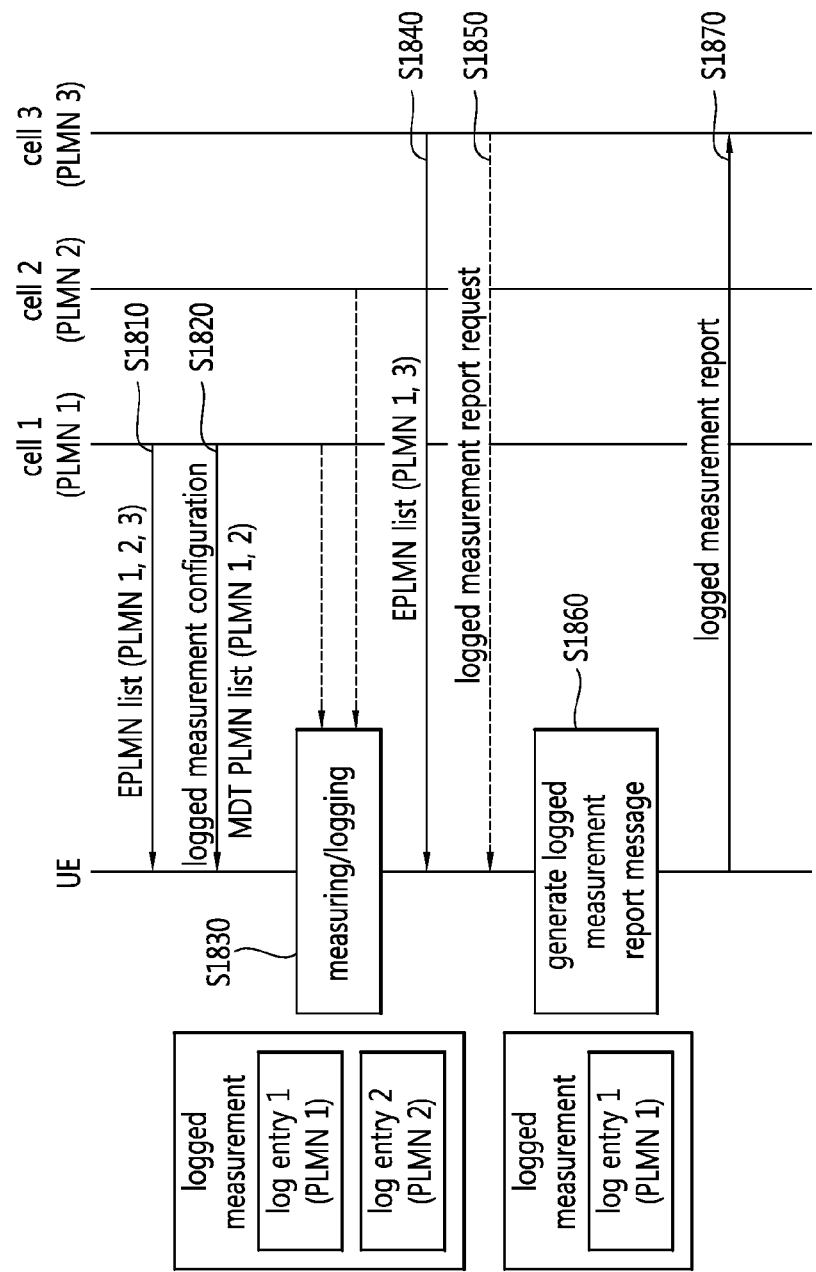
FIG. 18 shows another example of a method of performing a logged MDT according to an embodiment of the present invention.

FIG. 18 shows another example of a method of performing a logged MDT according to an embodiment of the present invention. In the example of FIG. 18, it is assumed that a cell 1, a cell 2, and a cell 2 are managed based on a PLMN 1, a PLMN 2, and a PLMN 3, respectively.

Referring to FIG. 18, a UE acquires an EPLMN list from the cell 1 (step S1810). The EPLMN list may include the PLMNs 1, 2, and 3. The UE receives a logged measurements configuration from the cell 1 (step S1820). The logged measurement configuration may include an MDT PLMN list, and the MDT PLMN list may include the PLMNs 1 and 2.

The UE performs measuring and logging based on the received logged measurements configuration (step S1830). The UE performs measuring on the cell 1 based on the PLMN 1, and logs a measurement result. The UE performs measuring on the cell 2 based on the PLMN 2 and logs a measurement result.

The UE acquires a new EPLMN list from the cell 3 (step S1840). A newly configured EPLMN list may include the PLMNs 1 and 3. The UE may acquire the new EPLMN list, and may confirm a presence/absence of a PLMN which is not included in the new EPLMN list among at least one PLMN included in the existing MDT PLMN list. In addition, it may be confirmed that a log entry related to a corresponding PLMN is no longer valid. However, the UE may maintain the logged measurement, instead of discarding the invalid log entry in the logged measurement. The UE may persistently perform the logged MDT while maintaining the logged measurement. The UE may perform the logged MDT on the basis of a previously logged measurements configuration and reconfigured MDT PLMN list. The reconfigured MDT PLMN list may be reconfigured to include at least one remaining PLMN other than a PLMN not included in the newly acquired EPLMN list among PLMNs included in the old MDT PLMN list.

The UE enters an RRC_connected state, and receives a logged measurement report request message from a network (step S1850).

The UE generates a logged measurement report message in response to the logged measurement report request message (step S1860). When generating the logged measurement report message, the UE may exclude an invalid log entry while including a valid log entry.

The UE transmits a logged measurement report message including only the valid log entry to the network (step S1870). The UE may report the logged measurement report message to the network and may discard the invalid log entry.

Figure 19:
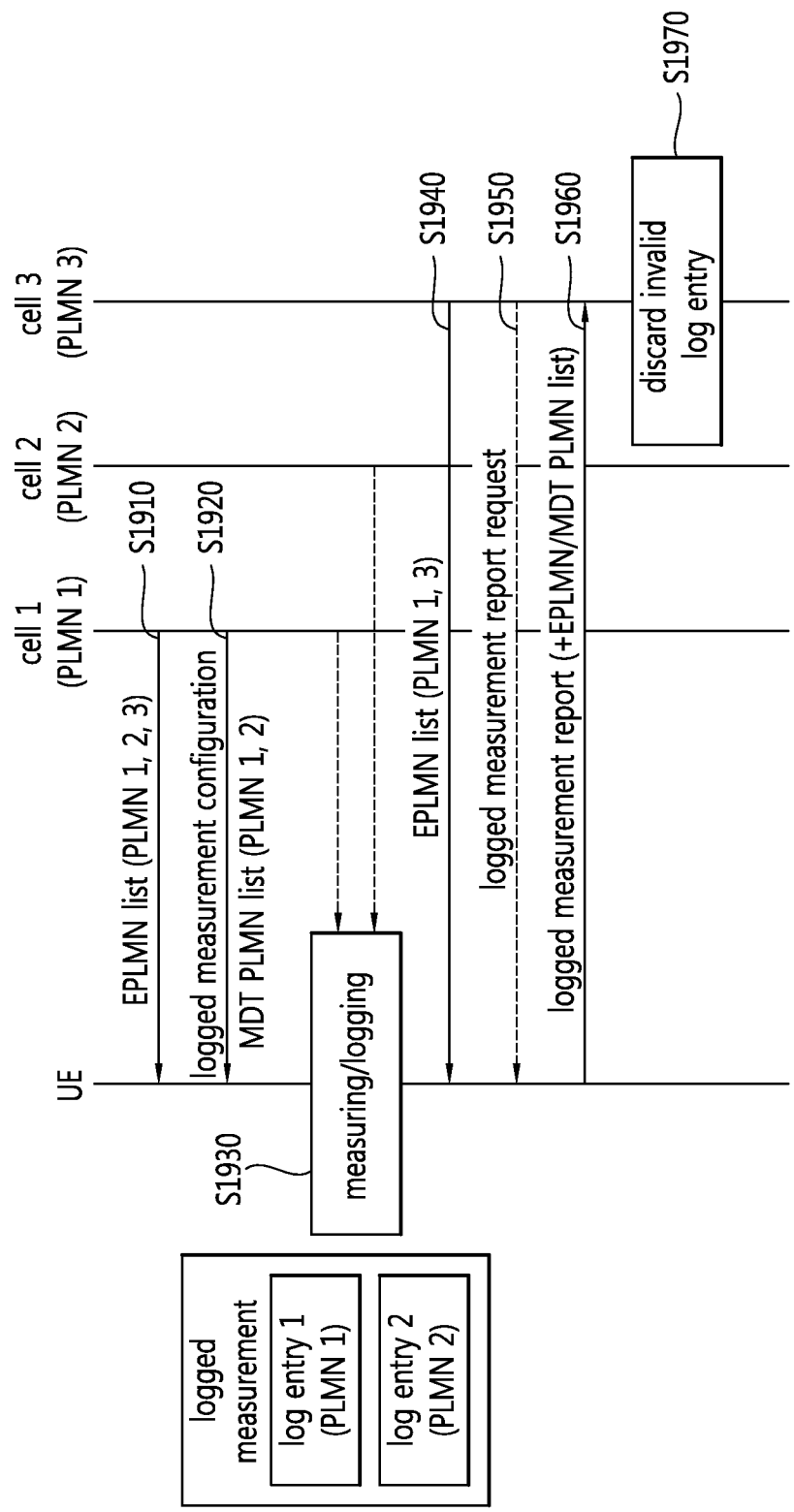
FIG. 19 shows another example of a method of performing a logged MDT according to an embodiment of the present invention.

FIG. 19 shows another example of a method of performing a logged MDT according to an embodiment of the present invention. In the example of FIG. 19, it is assumed that a cell 1, a cell 2, and a cell 2 are managed based on a PLMN 1, a PLMN 2, and a PLMN 3, respectively.

Referring to FIG. 19, a UE acquires an EPLMN list from the cell 1 (step S1910). The EPLMN list may include the PLMNs 1, 2, and 3. The UE receives a logged measurements configuration from the cell 1 (step S1920). The logged measurement configuration may include an MDT PLMN list, and the MDT PLMN list may include the PLMNs 1 and 2.

The UE performs measuring and logging based on the received logged measurements configuration (step S1930). The UE performs measuring on the cell 1 based on the PLMN 1, and logs a measurement result. The UE performs measuring on the cell 2 based on the PLMN 2 and logs a measurement result.

The UE acquires a new EPLMN list from the cell 3 (step S1940). The UE may acquire the new EPLMN list, and may confirm or may not confirm a validity of the log entry. However, even if an existence of an invalid log entry is confirmed, this may not be discarded, and a logged measurement may be maintained.

The UE may acquire the new EPLMN list, and may persistently perform the logged MDT. The UE may perform the logged MDT on the basis of a previously logged measurements configuration and reconfigured MDT PLMN list. The reconfigured MDT PLMN list may be reconfigured to include at least one remaining PLMN other than a PLMN not included in the newly acquired EPLMN list among PLMNs included in the old MDT PLMN list.

The UE enters an RRC_connected state, and receives a logged measurement report request message from a network (step S1950).

The UE generates a logged measurement report message in response to the logged measurement report request message, and transmits it to the network (step S1960). The UE may allow the logged measurement report message to include the logged measurement, and if an invalid log entry is included in the logged measurement, information indicating that the invalid log entry may also be included. Meanwhile, the information indicating that the invalid logged measurement is present in the logged measurement may be transmitted together when a logged measurements available indicator is transmitted. Additionally, the UE may transmit the logged measurement report message by including it to an old MDT PLMN list and a newly acquired EPLMN list. In addition, the UE may transmit a reconfigured MDT PLMN list by including it to a logged measurement report message.

The network acquires a logged measurement report message from the UE, and discards an invalid log entry (step S1970). The network may confirm the invalid log entry on the basis of PLMN list related information reported together with the logged measurement. If the old MDT PLMN list and the newly acquired EPLMN list are reported, it may be determined that a log entry related to a PLMN not included in the newly acquired EPLMN list among at least one PLMN included in the old MDT PLMN list is invalid. If the reconfigured MDT PLMN list is reported, it may be determined that a log entry related to a PLMN not corresponding to a PLMN included in the MDT PLMN list is invalid.

The method of performing the logged MDT by the UE when the EPLMN list is newly configured is described above with reference to FIG. 16 to FIG. 19. Similarly, even if the MDT PLMN list is newly configured, the UE may be allowed to determine a validity of the log entry, and may report only a valid log entry to the network or the network may be allowed to distinguish the valid log entry among reported log entries.

As shown in FIG. 16, the UE may discard the logged measurement when the new MDT PLMN list is provided. The new MDT PLMN list may be provided by being included in a logged measurements configuration transmitted from a cell, and the logged measurements configuration may include additional information for performing the logged MDT. Therefore, the UE may discard the old logged measurement configuration including the old MDT PLMN list, and may perform the logged MDT by applying the received logged measurement configuration. In this case, a logging duration may be restarted.

As shown in FIG. 17, the UE determines a validity for a log entry in the logged measurement when the new MDT PLMN list is provided. The UE may determine that a log entry related to a PLMN not existing in the new MDT PLMN list is invalid. The UE may discard the invalid log entry, and only a valid log entry may be included in the log entry. To discard the invalid log entry immediately, the network may provide information for instructing to discard the invalid log entry to the UE by including the information into a corresponding logged measurement configuration. Only for a case where corresponding indication information instructs to discard it, the UE may be implemented to discard the invalid log entry when the new MDT PLMN list is provided.

As shown in FIG. 18, when the new MDT PLMN list is provided, the UE may determine whether a log entry is valid, and may not discard an invalid log entry. In this case, when reporting the logged measurement configuration, the UE may transmit a report message to the network by excluding the invalid log entry from a report message and by including only a valid log entry.

Meanwhile, as a first MDT PLMN list is provided at a specific time, a log entry which is determined to be invalid may be determined as a valid log entry on the basis of a $2^{nd}$ MDT PLMN list at a later time. Therefore, the UE may report to the network a log entry which is determined to be valid again.

In order to prevent the invalid log entry from being discarded even if the new MDT PLMN list is provided as described above, the network may provide information of instructing not to discard the invalid log entry to the UE by including the information into a corresponding logged measurement configuration. Meanwhile, the UE may discard the invalid log entry after reporting the valid log entry. The discarded log entry cannot be a target of a validity determination even if the new MDT PLMN list is provided.

Although the UE is provided with the new MDT PLMN list, if the invalid log entry is not discarded immediately, a logging duration for performing the logged MDT of the UE may elapse continuously in succession after being restarted by a previous logged measurement configuration.

As shown in FIG. 19, when the new MDT PLMN list is provided, the UE may determine whether the log entry is valid, and may not discard the invalid log entry. In addition, upon receiving the logged measurement report request message from the network, the logged measurement report message is transmitted in response thereto. The report message may include both the valid log entry and the invalid log entry.

When the UE transmits the logged measurement report message by including the invalid log entry, the MDT PLMN list of the UE may be included in the logged measurement report message to be transmitted. If the UE transmits the logged measurement report message by including the invalid log entry, information indicating that the invalid log entry is included may be transmitted together through the network. In this case, the indication information may be included in the logged measurement report message and/or may be transmitted together when the logged measurements available indicator is transmitted.

The network may discard the invalid log entry on the basis of the UE's MDT PLMN list provided from the UE. If the MDT PLMN list of the UE is invalid in a corresponding eNB, the eNB may determine that another configured PLMN list may be applied as an MDT PLMN list for the UE. In this case, the configured PLMN list may be a PLMN list in a handover restriction list.

Meanwhile, in the aforementioned embodiment of the present invention described with reference to the drawings, instead of including both of the MCC and the MNC to implement information of identifying a specific PLMN in the MDT PLMN list, the network may allow to include one of the two. The MDT PLMN list implemented in this manner may be called a delta signaled PLMN list. That is, a specific PLMN is not identified through a pair of the MCC and the MNC but may be identified through the MCC or the MNC. In this case, on the basis of an MCC and MNC of a reference PLMN, the UE may confirm which PLMN is identified by the MCC or the MNC. That is, if one MCC is provided for the specific PLMN, the UE may confirm the PLMN on the basis of the MNC of the reference PLMN and the provided MCC. In addition, if one MNC is provided for the specific PLMN, the UE may confirm the PLMN on the basis of the MCC of the reference PLMN and the provided MNC.

Various options may be provided to determine the reference PLMN considered to identify the specific PLMN by using the MCC or the MNC.

1) The reference PLMN may be an RPLMN of a UE at a time of providing the UE with a logged measurements configuration in which an MDT PLMN list is included.

2) The reference PLMN may be a PLMN indicated by indication information among PLMNs in the MDP PLMN list. For this, a flag bit for each PLMN may be included in the MDT PLMN list, and a corresponding PLMN of which a flag bit is true may be the reference PLMN. A PLMN of which a flag bit is false may not be the reference PLMN. Instead of the flag bit, identification information indicating the reference PLMN may be included in the MDT PLMN list.

3) Meanwhile, the options 1) and 2) may be combined. The UE may confirm whether indication information related to the reference PLMN exists in the MDT PLMN list, and if exists, may confirm the reference PLMN on the basis of the indication information. Otherwise if not exist, the UE may consider an RPLMN at a time of providing a logged measurements configuration as the reference PLMN.

The UE may confirm a PLMN for performing the logged MDT also when a delta signaled PLMN list is received. The UE may determine a validity of a log entry on the basis of the confirmed PLMN, a new RPLMN list, and/or a new MDT PLMN list (including the delta signaled PLMN list).

According to the aforementioned method of performing a logged MDT on the basis of the embodiment of the present invention, when there is a change in an EPLMN list and/or an MDT PLMN list, a UE may determine whether the PLMN list is valid and may report a logged measurement. In the reporting, the UE reports only a valid log entry or provides information which allows a network to determine a validity of a log entry together. Accordingly, the network can appropriately acquire a valid log entry. An invalid log entry can be distinguished through such an operation, and the network can more efficiently implement a network optimization on the basis of location information and a measurement result based on the valid log entry.

In addition, in a case where the MDT PLMN list is provided to the UE, if the MDT PLMN list is provided with a PLMN list format which is subjected to delta signaling proposed in the present invention, a signal overhead which occurs when a logged measurements configuration is provided to perform a logged MDT can be decreased.

Figure 20:
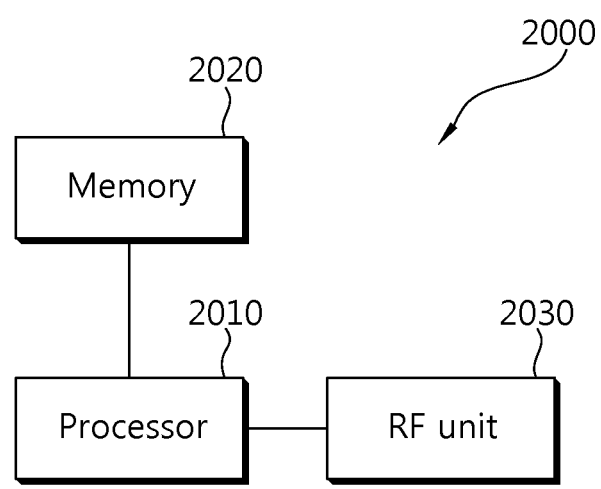
FIG. 20 is a block diagram of a wireless device according to an embodiment of the present invention.

FIG. 20 is a block diagram of a wireless device according to an embodiment of the present invention. This device may implement an operation of a UE and/or network for performing the aforementioned embodiment described above with reference to FIG. 16 to FIG. 19.

A wireless device 2000 includes a processor 2010, a memory 2020, and a radio frequency (RF) unit 2030. The processor 2010 implements the proposed functions, procedure, and/or methods. The processor 2010 may be configured to perform a logged MDT on the basis of a logged measurements configuration. When a new PLMN list such as an EPLMN list and/or an MDT PLMN list is acquired during the logged MDT is performed, the processor 2010 may be configured to determine whether a log entry is valid on the basis of the acquired list. The processor 2010 may be configured to report the logged measurement to the network on the basis of the result obtained by determining the log entry validity. The processor 2010 may be configured to implement the aforementioned embodiment of the present invention with reference to the drawings.

The RF unit 2030 is coupled to the processor 2010, and transmits and receives a radio signal.

The processor 2010 and the RF unit 2030 may be implemented to be capable of transmitting/receiving a radio signal according to at least one communication protocol. The RF unit 2030 may include at least one transceiver capable of transmitting and receiving the radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of reporting performed by a user equipment (UE) in a wireless communication system, the method comprising:

acquiring a first public land mobile network (PLMN) list from a first cell;

logging a log entry containing a measurement result within a logged measurement, wherein the log entry is related to at least one PLMN contained in the first PLMN list for a logged measurements configuration provided for the logging;

acquiring a second PLMN list from a second cell;

determining a validity of the log entry on the basis of the first PLMN list and the second PLMN list; and reporting a logged measurement report message for a valid log entry to the second cell on the basis of a result of the validity determination, wherein in the determining the validity of the log entry, the log entry for the PLMN is determined to be valid when the PLMN is included in both the first PLMN list and the second PLMN list, and wherein in the determining the validity of the log entry, the log entry for the PLMN is determined to be invalid when the PLMN is not included in both the first PLMN list and the second PLMN list.

2. The method of claim 1, wherein the second PLMN list is a new equivalent PLMN (EPLMN), and the new EPLMN list contains at least one EPLMN for the user equipment.

3. The method of claim 2, wherein the determining of the validity of the log entry comprises:
determining whether a specific PLMN related to the log entry is contained in the EPLMN list; and
if the specific PLMN is not contained in the EPLMN list, determining that the log entry is invalid.

4. The method of claim 1, wherein the second PLMN list is a new MDT PLMN list, and the new MDT list contains at least one PLMN for the logging of the user equipment.

5. The method of claim 4, wherein the determining of the validity of the log entry comprises:
determining whether the specific PLMN related to the log entry is contained in the MDT PLMN list; and
if the specific PLMN is not contained in the MDT PLMN list, determining that the log entry is invalid.

6. The method of claim 1, further comprising:
if the second PLMN list is acquired, discarding the logged measurement in which the log entry is logged; and
logging a new log entry including a logging result in a new logged measurement on the basis of the second PLMN list,
wherein the logged measurement report message contains the new logged measurement.

7. The method of claim 1, further comprising, if it is determined that the log entry is invalid, discarding the log entry, wherein the logged measurement report message contains a logged measurement in which the log entry is excluded.

8. The method of claim 7, wherein the log entry is discarded after the logged measurement report message is reported.

9. The method of claim 1, wherein the logged measurement report message contains:
a logged measurement in which the log entry is logged;
the first PLMN list; and
the second PLMN list.

10. A wireless device operating in a wireless communication system, the wireless device comprising:
a radio frequency (RF) unit for transmitting and receiving a radio signal; and
a processor operatively coupled to the RF unit, wherein the processor is configured for:
acquiring a first public land mobile network (PLMN) list from a first cell via the RF unit;
logging a log entry containing a measurement result within a logged measurement, wherein the log entry is related to at least one PLMN contained in the first PLMN list for a logged measurements configuration provided for the logging;
acquiring a second PLMN list from a second cell via the RF unit;
determining a validity of the log entry on the basis of the first PLMN list and the second PLMN list; and
reporting a logged measurement report message for a valid log entry to the second cell on the basis of a result of the validity determination,
wherein in the determining the validity of the log entry, the log entry for the PLMN is determined to be valid when the PLMN is included in both the first PLMN list and the second PLMN list, and
wherein in the determining the validity of the log entry, the log entry for the PLMN is determined to be invalid when the PLMN is not included in both the first PLMN list and the second PLMN list.

11. The wireless device of claim 10, wherein the second PLMN list is a new equivalent PLMN (EPLMN), and the new EPLMN list contains at least one EPLMN for the wireless device.

12. The wireless device of claim 11, wherein the determining of the validity of the log entry comprises:
determining whether a specific PLMN related to the log entry is contained in the EPLMN list; and
if the specific PLMN is not contained in the EPLMN list, determining that the log entry is invalid.

13. The wireless device of claim 10, wherein the second PLMN list is a new MDT PLMN list, and the new MDT list contains at least one PLMN for the logging of the wireless device.

14. The wireless device of claim 13, wherein the determining of the validity of the log entry comprises:
determining whether the specific PLMN related to the log entry is contained in the MDT PLMN list; and
if the specific PLMN is not contained in the MDT PLMN list, determining that the log entry is invalid.

15. The wireless device of claim 10, wherein the processor is configured for:
if the second PLMN list is acquired, discarding the logged measurement in which the log entry is logged; and
logging a new log entry including a logging result in a new logged measurement on the basis of the second PLMN list,
wherein the logged measurement report message contains the new logged measurement.

16. The wireless device of claim 10, wherein the processor is configured for, if it is determined that the log entry is invalid, discarding the log entry, wherein the logged measurement report message contains a logged measurement in which the log entry is excluded.

17. The wireless device of claim 16, wherein the log entry is discarded after the logged measurement report message is reported.

18. The wireless device of claim 10, wherein the logged measurement report message contains:
a logged measurement in which the log entry is logged;
the first PLMN list; and
the second PLMN list.

* * * * *